United States Patent
Larimore et al.

(10) Patent No.: US 9,229,748 B2
(45) Date of Patent: Jan. 5, 2016

(54) METHOD AND SYSTEM FOR IMPROVING STARTUP PERFORMANCE AND INTEROPERABILITY OF A VIRTUAL APPLICATION

(75) Inventors: Stefan I. Larimore, Redmond, WA (US); C. Michael Murphey, Seattle, WA (US); Kenji C. Obata, Seattle, WA (US)

(73) Assignee: CODE SYSTEMS CORPORATION, Seattle, WA (US)

(*) Notice: Subject to any disclaimer, the term of this patent is extended or adjusted under 35 U.S.C. 154(b) by 1036 days.

(21) Appl. No.: 12/697,029

(22) Filed: Jan. 29, 2010

(65) Prior Publication Data

US 2011/0191772 A1    Aug. 4, 2011

(51) Int. Cl.
*G06F 9/46* (2006.01)
*G06F 13/00* (2006.01)
*G06F 15/177* (2006.01)
*G06F 17/30* (2006.01)
*G06F 12/00* (2006.01)
*G06F 9/455* (2006.01)

(52) U.S. Cl.
CPC *G06F 9/455* (2013.01); *G06F 9/46* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 4,468,732 A | 8/1984 | Raver | |
| 5,437,031 A | 7/1995 | Kitami | |
| 5,495,610 A | 2/1996 | Shing et al. | |
| 5,860,068 A | 1/1999 | Cook | |
| 5,987,590 A | 11/1999 | So | |
| 6,013,712 A | 1/2000 | Spear et al. | |
| 6,263,363 B1 | 7/2001 | Rosenblatt et al. | |
| 6,453,334 B1 | 9/2002 | Vinson et al. | |
| 6,493,733 B1 | 12/2002 | Pollack et al. | |
| 6,564,229 B1 | 5/2003 | Baweja et al. | |
| 6,675,216 B1 | 1/2004 | Quatrano et al. | |
| 6,704,808 B2 | 3/2004 | Kasamatsu et al. | |
| 6,757,893 B1 | 6/2004 | Haikin | |
| 7,028,295 B2 | 4/2006 | Li et al. | |
| 7,064,760 B2 | 6/2006 | Capin et al. | |

(Continued)

OTHER PUBLICATIONS

Information Disclosure Statement Transmittal Letter filed herewith on Jul. 27, 2012, 2 pages.

(Continued)

*Primary Examiner* — Charles E Anya
*Assistant Examiner* — Phuong Hoang
(74) *Attorney, Agent, or Firm* — Davis Wright Tremaine LLP; Heather M. Colburn

(57) ABSTRACT

A data structure including simple and complex objects. Each simple object includes a content type indicator, a size indicator, and one or more simple data types. Each complex object includes a content type indicator, a size indicator, and one or more child objects. The complex objects include a layer object having first and second child objects. The first child object is a collection of complex objects storing information for configuring a virtual filesystem of a virtual application at application startup. The second child object is a collection of complex objects storing information for configuring a virtual registry of the virtual application at application startup. Reading of selected simple and complex objects may be deferred at startup based on the content type indicator. Deferred objects may be read after startup when access to information stored by the deferred object is request by the virtual application.

14 Claims, 12 Drawing Sheets

(56) References Cited

U.S. PATENT DOCUMENTS

| | | | |
|---|---|---|---|
| 7,065,504 B2 | 6/2006 | Sakuma et al. | |
| 7,076,768 B2 | 7/2006 | Li et al. | |
| 7,089,259 B1 | 8/2006 | Kouznetsov et al. | |
| 7,096,253 B2 | 8/2006 | Vinson et al. | |
| 7,096,416 B1 | 8/2006 | Smith et al. | |
| 7,117,495 B2 * | 10/2006 | Blaser et al. | 717/174 |
| 7,130,073 B2 | 10/2006 | Kumar et al. | |
| 7,162,036 B2 | 1/2007 | Rowe | |
| 7,240,162 B2 | 7/2007 | De Vries | |
| 7,246,351 B2 | 7/2007 | Bloch et al. | |
| 7,272,613 B2 | 9/2007 | Sim et al. | |
| 7,337,298 B2 | 2/2008 | Kawachiya et al. | |
| 7,356,679 B1 | 4/2008 | Le et al. | |
| 7,360,097 B2 | 4/2008 | Rothstein | |
| 7,386,542 B2 | 6/2008 | Maybury et al. | |
| 7,437,371 B2 | 10/2008 | Rathakrishnan et al. | |
| 7,451,176 B2 | 11/2008 | Anders et al. | |
| 7,451,196 B1 | 11/2008 | de Vries et al. | |
| 7,499,991 B2 * | 3/2009 | Johnson et al. | 709/223 |
| 7,523,116 B2 | 4/2009 | Yan | |
| 7,536,541 B2 | 5/2009 | Isaacson | |
| 7,577,751 B2 | 8/2009 | Vinson et al. | |
| 7,590,644 B2 | 9/2009 | Matsakis et al. | |
| 7,600,097 B1 | 10/2009 | Wright | |
| 7,607,127 B2 | 10/2009 | Romm et al. | |
| 7,623,673 B2 | 11/2009 | Mercier | |
| 7,634,477 B2 | 12/2009 | Hinshaw | |
| 7,634,772 B2 | 12/2009 | Parthasarathy et al. | |
| 7,664,367 B2 | 2/2010 | Suzuki | |
| 7,669,189 B1 | 2/2010 | Umamageswaran | |
| 7,689,825 B2 | 3/2010 | Iwamura | |
| 7,707,564 B2 | 4/2010 | Marvin et al. | |
| 7,743,407 B2 | 6/2010 | Sprigg et al. | |
| 7,752,442 B2 | 7/2010 | Della-Libera et al. | |
| 7,752,511 B2 | 7/2010 | Fulton et al. | |
| 7,761,503 B2 | 7/2010 | Dhawan et al. | |
| 7,797,748 B2 | 9/2010 | Zheng et al. | |
| 7,801,827 B2 | 9/2010 | Bishop et al. | |
| 7,831,047 B2 | 11/2010 | Rowe | |
| 7,836,299 B2 | 11/2010 | England et al. | |
| 7,840,961 B1 | 11/2010 | Weathersby | |
| 7,950,026 B1 | 5/2011 | Urbach | |
| 7,958,497 B1 | 6/2011 | Lindo et al. | |
| 7,970,789 B1 | 6/2011 | Blaser et al. | |
| 7,971,032 B2 | 6/2011 | Shattuck | |
| 8,010,667 B2 | 8/2011 | Zhang et al. | |
| 8,065,675 B2 | 11/2011 | Strauss et al. | |
| 8,069,443 B2 | 11/2011 | Ackerman et al. | |
| 8,219,805 B1 | 7/2012 | Le et al. | |
| 8,230,442 B2 | 7/2012 | Aho et al. | |
| 8,271,944 B2 | 9/2012 | Austin et al. | |
| 8,375,140 B2 | 2/2013 | Tippin et al. | |
| 8,387,006 B1 | 2/2013 | Taylor | |
| 8,429,248 B1 | 4/2013 | Ketrenos et al. | |
| 8,434,093 B2 | 4/2013 | Larimore et al. | |
| 8,468,175 B2 | 6/2013 | Obata | |
| 8,489,513 B2 | 7/2013 | Bishop et al. | |
| 8,510,734 B2 | 8/2013 | Criddle et al. | |
| 8,626,806 B2 | 1/2014 | Larimore et al. | |
| 8,677,345 B2 | 3/2014 | Choi et al. | |
| 8,719,898 B1 | 5/2014 | Barton et al. | |
| 8,745,601 B1 | 6/2014 | Carlson et al. | |
| 8,763,009 B2 | 6/2014 | Degirmenci et al. | |
| 2001/0016905 A1 | 8/2001 | Kasamatsu et al. | |
| 2002/0029283 A1 | 3/2002 | Beckett et al. | |
| 2002/0032754 A1 | 3/2002 | Logston et al. | |
| 2002/0066085 A1 | 5/2002 | Nowlin, Jr. et al. | |
| 2002/0099951 A1 | 7/2002 | O'Connor | |
| 2002/0112078 A1 | 8/2002 | Yach | |
| 2002/0129129 A1 | 9/2002 | Bloch et al. | |
| 2002/0133491 A1 | 9/2002 | Sim et al. | |
| 2002/0161578 A1 | 10/2002 | Saindon et al. | |
| 2002/0162015 A1 | 10/2002 | Tang | |
| 2002/0174193 A1 | 11/2002 | Mikhalchuk | |
| 2003/0031176 A1 | 2/2003 | Sim et al. | |
| 2003/0051169 A1 | 3/2003 | Sprigg et al. | |
| 2004/0083474 A1 | 4/2004 | McKinlay et al. | |
| 2004/0128342 A1 | 7/2004 | Maes et al. | |
| 2004/0133444 A1 | 7/2004 | Defaix et al. | |
| 2004/0139315 A1 | 7/2004 | Tokutani et al. | |
| 2005/0132359 A1 | 6/2005 | McGuire et al. | |
| 2005/0198628 A1 | 9/2005 | Graham et al. | |
| 2005/0198647 A1 | 9/2005 | Hipp et al. | |
| 2005/0262553 A1 | 11/2005 | Bialick et al. | |
| 2005/0273772 A1 | 12/2005 | Matsakis et al. | |
| 2006/0048136 A1 | 3/2006 | Vries et al. | |
| 2006/0053380 A1 | 3/2006 | Spataro et al. | |
| 2006/0074733 A1 | 4/2006 | Shukla et al. | |
| 2006/0075064 A1 | 4/2006 | Keohane et al. | |
| 2006/0085359 A1 | 4/2006 | Kim | |
| 2006/0123185 A1 | 6/2006 | de Vries et al. | |
| 2006/0168294 A1 | 7/2006 | de Vries et al. | |
| 2006/0218165 A1 | 9/2006 | Vries et al. | |
| 2006/0222203 A1 | 10/2006 | Mercier | |
| 2006/0230175 A1 | 10/2006 | de Vries | |
| 2006/0242626 A1 | 10/2006 | Pham et al. | |
| 2006/0248442 A1 | 11/2006 | Rosenstein et al. | |
| 2006/0253535 A1 | 11/2006 | Betros et al. | |
| 2006/0256130 A1 | 11/2006 | Gonzalez | |
| 2006/0259585 A1 | 11/2006 | Keohane et al. | |
| 2007/0011672 A1 | 1/2007 | Bhide et al. | |
| 2007/0016721 A1 * | 1/2007 | Gay | 711/103 |
| 2007/0043943 A1 | 2/2007 | Peretti | |
| 2007/0078988 A1 | 4/2007 | Miloushev et al. | |
| 2007/0143704 A1 | 6/2007 | Laird-McConnell | |
| 2007/0168953 A1 | 7/2007 | Diez et al. | |
| 2007/0168965 A1 | 7/2007 | Zenz et al. | |
| 2007/0174824 A1 | 7/2007 | Relyea et al. | |
| 2007/0226798 A1 | 9/2007 | Siebert | |
| 2007/0234277 A1 | 10/2007 | Lei et al. | |
| 2007/0240155 A1 | 10/2007 | Shlomai | |
| 2007/0245331 A1 | 10/2007 | Daynes et al. | |
| 2007/0277102 A1 | 11/2007 | Kanzaki | |
| 2007/0294674 A1 | 12/2007 | Marilly et al. | |
| 2008/0010389 A1 | 1/2008 | Iwata | |
| 2008/0155171 A1 | 6/2008 | Jeong | |
| 2008/0163194 A1 | 7/2008 | Dias et al. | |
| 2008/0181230 A1 | 7/2008 | Hitt et al. | |
| 2008/0184135 A1 | 7/2008 | Washburn et al. | |
| 2008/0235680 A1 | 9/2008 | Strauss et al. | |
| 2008/0275938 A1 | 11/2008 | Yach | |
| 2008/0281882 A1 | 11/2008 | Hachio et al. | |
| 2008/0294877 A1 | 11/2008 | Haga et al. | |
| 2008/0298219 A1 | 12/2008 | Yamagata et al. | |
| 2008/0301672 A1 | 12/2008 | Rao et al. | |
| 2009/0055542 A1 | 2/2009 | Zhao et al. | |
| 2009/0064086 A1 | 3/2009 | Faus et al. | |
| 2009/0076966 A1 | 3/2009 | Bishop et al. | |
| 2009/0077551 A1 | 3/2009 | Whiteley | |
| 2009/0077645 A1 | 3/2009 | Kottahachchi | |
| 2009/0110307 A1 | 4/2009 | Markowitz | |
| 2009/0132811 A1 | 5/2009 | Koster et al. | |
| 2009/0158432 A1 | 6/2009 | Zheng et al. | |
| 2009/0193057 A1 | 7/2009 | Maes | |
| 2009/0198358 A1 | 8/2009 | Logan et al. | |
| 2009/0199175 A1 | 8/2009 | Keller et al. | |
| 2009/0216811 A1 | 8/2009 | Manczak et al. | |
| 2009/0235158 A1 | 9/2009 | Rosenstein et al. | |
| 2009/0240663 A1 | 9/2009 | Plattner et al. | |
| 2009/0249071 A1 | 10/2009 | De Atley et al. | |
| 2009/0249324 A1 | 10/2009 | Brar et al. | |
| 2009/0300076 A1 | 12/2009 | Friedman et al. | |
| 2009/0300151 A1 | 12/2009 | Friedman et al. | |
| 2009/0307351 A1 | 12/2009 | Raja et al. | |
| 2009/0307763 A1 | 12/2009 | Rawlins et al. | |
| 2009/0313322 A1 | 12/2009 | Sheehan et al. | |
| 2009/0328030 A1 | 12/2009 | Fries | |
| 2010/0005291 A1 | 1/2010 | Hulten et al. | |
| 2010/0023640 A1 | 1/2010 | Vinson et al. | |
| 2010/0023934 A1 | 1/2010 | Sheehan et al. | |
| 2010/0023974 A1 | 1/2010 | Shiragaki et al. | |
| 2010/0037206 A1 | 2/2010 | Larimore et al. | |
| 2010/0037235 A1 | 2/2010 | Larimore et al. | |
| 2010/0077096 A1 | 3/2010 | Philip et al. | |

(56) References Cited

U.S. PATENT DOCUMENTS

| | | |
|---|---|---|
| 2010/0088448 A1 | 4/2010 | Min et al. |
| 2010/0106804 A1 | 4/2010 | He et al. |
| 2010/0107163 A1 | 4/2010 | Lee |
| 2010/0121973 A1 | 5/2010 | Lobacheva et al. |
| 2010/0131084 A1 | 5/2010 | Van Camp |
| 2010/0138479 A1 | 6/2010 | Zhu |
| 2010/0146590 A1 | 6/2010 | Jung |
| 2010/0169790 A1 | 7/2010 | Vaughan et al. |
| 2010/0205604 A1 | 8/2010 | Brower et al. |
| 2010/0241718 A1 | 9/2010 | Rasmussen et al. |
| 2010/0250782 A1 | 9/2010 | Pratt et al. |
| 2010/0281458 A1 | 11/2010 | Paladino et al. |
| 2010/0306849 A1 | 12/2010 | Zheng et al. |
| 2010/0318997 A1 | 12/2010 | Lei et al. |
| 2010/0322523 A1 | 12/2010 | Mitsuashi et al. |
| 2010/0333085 A1 | 12/2010 | Criddle et al. |
| 2011/0004840 A1 | 1/2011 | Feinberg et al. |
| 2011/0078625 A1 | 3/2011 | Mumford et al. |
| 2011/0106908 A1 | 5/2011 | Risku et al. |
| 2011/0145428 A1 | 6/2011 | Wei et al. |
| 2011/0145592 A1 | 6/2011 | Greiner |
| 2011/0145726 A1 | 6/2011 | Wei et al. |
| 2011/0153437 A1 | 6/2011 | Archer et al. |
| 2011/0153975 A1 | 6/2011 | Accapadi et al. |
| 2011/0173607 A1 | 7/2011 | Murphey et al. |
| 2011/0179411 A1 | 7/2011 | Lederer |
| 2011/0185013 A1 | 7/2011 | Obata et al. |
| 2011/0185043 A1 | 7/2011 | Zeller et al. |
| 2011/0246659 A1 | 10/2011 | Bouazizi |
| 2011/0289513 A1 | 11/2011 | Degirmenci et al. |
| 2012/0005237 A1 | 1/2012 | Obata |
| 2012/0005244 A1 | 1/2012 | Obata et al. |
| 2012/0005246 A1 | 1/2012 | Obata |
| 2012/0005309 A1 | 1/2012 | Obata |
| 2012/0005310 A1 | 1/2012 | Obata |
| 2012/0005334 A1 | 1/2012 | Raja et al. |
| 2012/0005674 A1 | 1/2012 | Larimore et al. |
| 2012/0096071 A1 | 4/2012 | Murphey et al. |
| 2012/0110337 A1 | 5/2012 | Murphey et al. |
| 2012/0125993 A1 | 5/2012 | Thiele et al. |
| 2012/0150986 A1 | 6/2012 | Piccinini et al. |
| 2012/0155358 A1 | 6/2012 | Hao et al. |
| 2012/0203807 A1 | 8/2012 | Larimore et al. |
| 2012/0203808 A1 | 8/2012 | Larimore et al. |
| 2013/0086386 A1 | 4/2013 | Murphey et al. |
| 2013/0132525 A1 | 5/2013 | Tippin |
| 2013/0139250 A1 | 5/2013 | Lo et al. |
| 2013/0191882 A1 | 7/2013 | Jolfaei |
| 2013/0247070 A1 | 9/2013 | Larimore et al. |
| 2013/0271456 A1 | 10/2013 | Haswell et al. |
| 2013/0275886 A1 | 10/2013 | Haswell et al. |
| 2013/0283362 A1 | 10/2013 | Kress et al. |
| 2014/0298401 A1 | 10/2014 | Batson et al. |

OTHER PUBLICATIONS

Non-Final Office Action received in U.S. Appl. No. 12/695,107, dated Dec. 8, 2011, 17 pages.
Non-Final Office Action received in U.S. Appl. No. 12/188,155, dated Dec. 19, 2011, 19 pages.
Non-Final Office Action received in U.S. Appl. No. 12/876,085, dated Mar. 8, 2012, 10 pages.
Non-Final Office Action received in U.S. Appl. No. 12/188,161, dated May 10, 2012, 14 pages.
Non-Final Office Action received in U.S. Appl. No. 12/879,956, dated Jun. 6, 2012, 11 pages.
Non-Final Office Action received in U.S. Appl. No. 13/717,258, dated Jul. 13, 2012, 15 pages.
Notice of Allowance received in U.S. Appl. No. 12/877,918, dated Mar. 19, 2012, 25 pages.
Notice of Allowance received in U.S. Appl. No. 12/877,918, dated Jun. 21, 2012, 31 pages.
Restriction Requirement received in U.S. Appl. No. 12/188,161, dated Dec. 20, 2011, 5 pages.
Restriction Requirement received in U.S. Appl. No. 12/876,085, dated Jan. 27, 2012, 6 pages.
Notice of Allowance received in U.S. Appl. No. 12/188,161, dated Dec. 4, 2012, 12 pages.
Non-Final Office Action received in U.S. Appl. No. 13/449,140, dated Dec. 7, 2012, 9 pages.
Non-Final Office Action received in U.S. Appl. No. 13/088,265, dated Dec. 12, 2012, 24 pages.
Non-Final Office Action received in U.S. Appl. No. 13/449,049, dated Dec. 13, 2012, 10 pages.
Final Rejection received in U.S. Appl. No. 12/188,155, dated Aug. 31, 2012, 20 pages.
Notice of Allowance received in U.S. Appl. No. 12/877,918, dated Aug. 16, 2012, 24 pages.
Notice of Allowance received in U.S. Appl. No. 12/877,918, dated Sep. 26, 2012, 21 pages.
Chapin, "Hive: Operating System Fault Containment for Shared-Memory Multiprocessors," Technical Report No. CSL-TR-97-712, Computer Systems Laboratory, Departments of Electrical Engineering and computer Science, Stanford University, Jul. 1997, 156 pages.
Final Office Action received in U.S. Appl. No. 12/876,085, dated Nov. 14, 2012, 12 pages.
Non-Final Office Action received in U.S. Appl. No. 12/906,904, dated Nov. 13, 2012, 19 pages.
Non-Final Office Action received in U.S. Appl. No. 12/685,576, dated Nov. 2, 2012, 8 pages.
Final Office Action received in U.S. Appl. No. 12/695,107, dated Oct. 30, 2012, 16 pages.
Non-Final Office Action received in U.S. Appl. No. 12/916,348, dated Oct. 24, 2012, 24 pages.
Non-Final Office Action received in U.S. Appl. No. 12/876,082, dated Oct. 22, 2012, 18 pages.
Notice of Allowance received in U.S. Appl. No. 12/188,161, dated Oct. 10, 2012, 13 pages.
Final Office Action received in U.S. Appl. No. 12/879,956, dated Nov. 23, 2012, 11 pages.
Information Disclosure Statement Transmittal Letter filed herewith on Nov. 30, 2012, 2 pages.
Susitaival, et al. "Anaylizing the File Availability and Download Time in a P2P File Sharing System," IEEE, 2007, pp. 88-95.
Final Office Action received in U.S. Appl. No. 13/171,258 dated Jan. 11, 2013, 33 pages.
Final Office Action received in U.S. Appl. No. 12/916,348, dated Jul. 11, 2013, 26 pages.
Final Office Action received in U.S. Appl. No. 13/449,140, dated Jul. 22, 2013, 13 pages.
Final Office Action received in U.S. Appl. No. 13/088,265, dated Jul. 25, 2013, 33 pages.
Non-Final Office Action received in U.S. Appl. No. 12/188,155, dated Feb. 28, 2013, 22 pages.
Non-Final Office Action received in U.S. Appl. No. 12/876,085, dated Mar. 18, 2013, 13 pages.
Non-Final Office Action received in U.S. Appl. No. 12/685,576, dated Jun. 20, 2013, 8 pages.
Non Final Office Action received in U.S. Appl. No. 12/879,947, dated Jul. 10, 2013, 22 pages.
Notice of Allowance received in U.S. Appl. No. 12/877,918, dated Apr. 26, 2013, 35 pages.
Notice of Allowance received in U.S. Appl. No. 12/697,029, dated May 24, 2013, 26 pages.
Notice of Allowance received in U.S. Appl. No. 12/188,161, dated Jan. 4, 2013, 13 pages.
Notice of Allowance received in U.S. Appl. No. 12/876,082, dated May 10, 2013, 26 pages.
Notice of Allowance received in U.S. Appl. No. 12/879,956, dated Feb. 21, 2013, 17 pages.
Notice of Allowance received in U.S. Appl. No. 13/449,049, dated Apr. 29, 2013, 9 pages.
Notice of Allowance received in U.S. Appl. No. 12/188,155, dated Jun. 25, 2013, 11 pages.
Restriction Requirement received in U.S. Appl. No. 12/705,492, dated Mar. 15, 2013, 5 pages.

(56) References Cited

OTHER PUBLICATIONS

Information Disclosure Statement Transmittal Letter, filed herewith on Aug. 23, 2013, 2 pages.
Notice of Allowance issued in U.S. Appl. No. 12/188,155 dated Oct. 25, 2013.
Notice of Allowance issued in U.S. Appl. No. 12/188,155 dated Feb. 13, 2014.
Final Office Action issued in U.S. Appl. No. 12/685,576, dated Jan. 30, 2014.
Restriction Requirement issued in U.S. Appl. No. 12/876,082, dated Aug. 6, 2014.
Notice of Allowance issued in U.S. Appl. No. 12/188,155 dated Feb. 28, 2014.
Notice of Allowance issued in U.S. Appl. No. 12/876,085 dated Mar. 6, 2014.
Notice of Allowance issued in U.S. Appl. No. 12/876,085 dated Nov. 14, 2013.
Notice of Allowance issued in U.S. Appl. No. 12/877,918 dated Dec. 13, 2013.
Notice of Allowance issued in U.S. Appl. No. 12/877,918 dated Aug. 20, 2013.
Notice of Allowance issued in U.S. Appl. No. 121879,947 dated Jan. 27, 2014.
Final Office Action issued in U.S. Appl. No. 12/906,904, dated Jul. 31, 2013.
Notice of Allowance issued in U.S. Appl. No. 12/916,348 dated Nov. 13, 2013.
Notice of Allowance issued in U.S. Appl. No. 13/088,265 dated Feb. 14, 2014.
Non-Final Office Action issued in U.S. Appl. No. 13/171,258, dated Apr. 29, 2014.
Notice of Allowance issued in U.S. Appl. No. 13/449,049, dated Aug. 13, 2013.
Non-Final Office Action issued in U.S. Appl. No. 13/499,140, dated Nov. 15, 2013.
Notice of Allowance issued in U.S. Appl. No. 13/449,140, dated Aug. 11, 2014.
Non-Final Office Action issued in U.S. Appl. No. 13/683,969, dated Feb. 28, 2014.
Notice of Allowance issued in U.S. Appl. No. 13/866,682, dated Jun. 25, 2014.
Non-Final Office Action issued in U.S. Appl. No. 13/918,067, dated Feb. 27, 2014.
64Non-Final Office Action issued in U.S. Appl. No. 12/916,348, dated Sep. 4, 2014.
Notice of Allowance issued in U.S. Appl. No. 12/695,107, dated Sep. 17, 2014.
Notice of Allowance issued in U.S. Appl. No. 12/685,576, dated Sep. 23, 2014.
Notice of Allowance issued in U.S. Appl. No. 12/705,492, dated Sep. 26, 2014.
Notice of Allowance issued in U.S. Appl. No. 12/876,082, dated Sep. 26, 2014.
Notice of Allowance issued in U.S. Appl. No. 12/697,029, dated Oct. 3, 2014.
Notice of Allowance issued in U.S. Appl. No. 12/906,904, dated Oct. 8, 2014.
Notice of Allowance issued in U.S. Appl. No. 13/866,682, dated Oct. 28, 2014.
Non-Final Office Action issued in U.S. Appl. No. 14/297,506, dated Nov. 6, 2014.
Non-Final Office Action issued in U.S. Appl. No. 13/683,969, dated 2014-11014.
Notice of Allowance issued in U.S. Appl. No. 13/918,067, dated Nov. 17, 2014.
Eugene Hung; "Using Nehavior Templates to Design remotely Executing Agents for Wireless Clients"; 2004.
Notice of Allowance received in U.S. Appl. No. 12/705,492, dated Oct. 31, 2014.
Notice of Allowance received in U.S. Appl. No. 13/449,140, dated Nov. 20, 2014.
Notice of Allowance received in U.S. Appl. No. 12/695,107, dated Jan. 5, 2015.
Final Office Action received in U.S. Appl. No. 13/171,258, dated Jan. 23, 2015.
Notice of Allowance received in U.S. Appl. No. 13/683,969, dated Feb. 4, 2015.
Notice of Allowance received in U.S. Appl. No. 13/866,682, dated Feb. 17, 2015.
Notice of Allowance received in U.S. Appl. No. 12/876,082, dated Feb. 20, 2015.
Non-Final Office Action received in U.S. Appl. No. 14/297,468, dated Feb. 26, 2015.
Notice of Allowance received in U.S. Appl. No. 13/918,067, dated Mar. 2, 2015.
Notice of Allowance received in U.S. Appl. No. 12/695,107, dated Mar. 19, 2015.
Notice of Allowance received in U.S. Appl. No. 12/916,348, dated Mar. 23, 2015.
Notice of Allowance received in U.S. Appl. No. 13/683,969, dated Apr. 2, 2015.
Non-Final Office Action received in U.S. Appl. No. 14/262,511, dated Apr. 27, 2015.
Zheng et al., "SODON: A High Availability Multi-Source Content Distribution Overlay," IEEE, 2004.
Informantion Disclosure Statement Transmittal Letter filed herewith.
ThinApp, Introduction to VMware ThinApp, VMware (Published Jun. 27, 2008) retrieved from http://vmware.com/pdf/thinapp_intro.pdf on Sep. 27, 2015.
Final Office Action, mailed in U.S. Appl. No. 14/297,468 on Oct. 16, 2015.

* cited by examiner

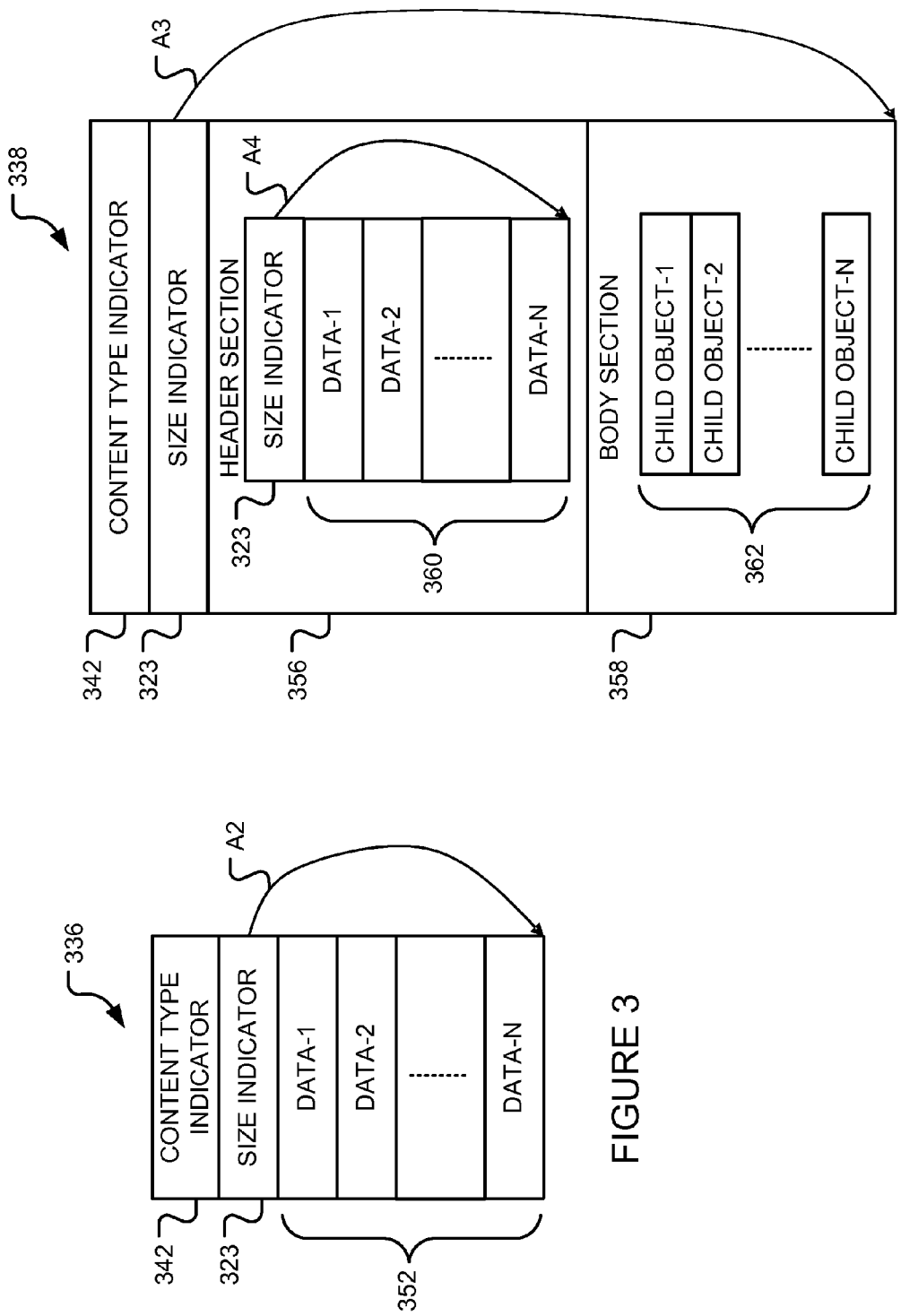

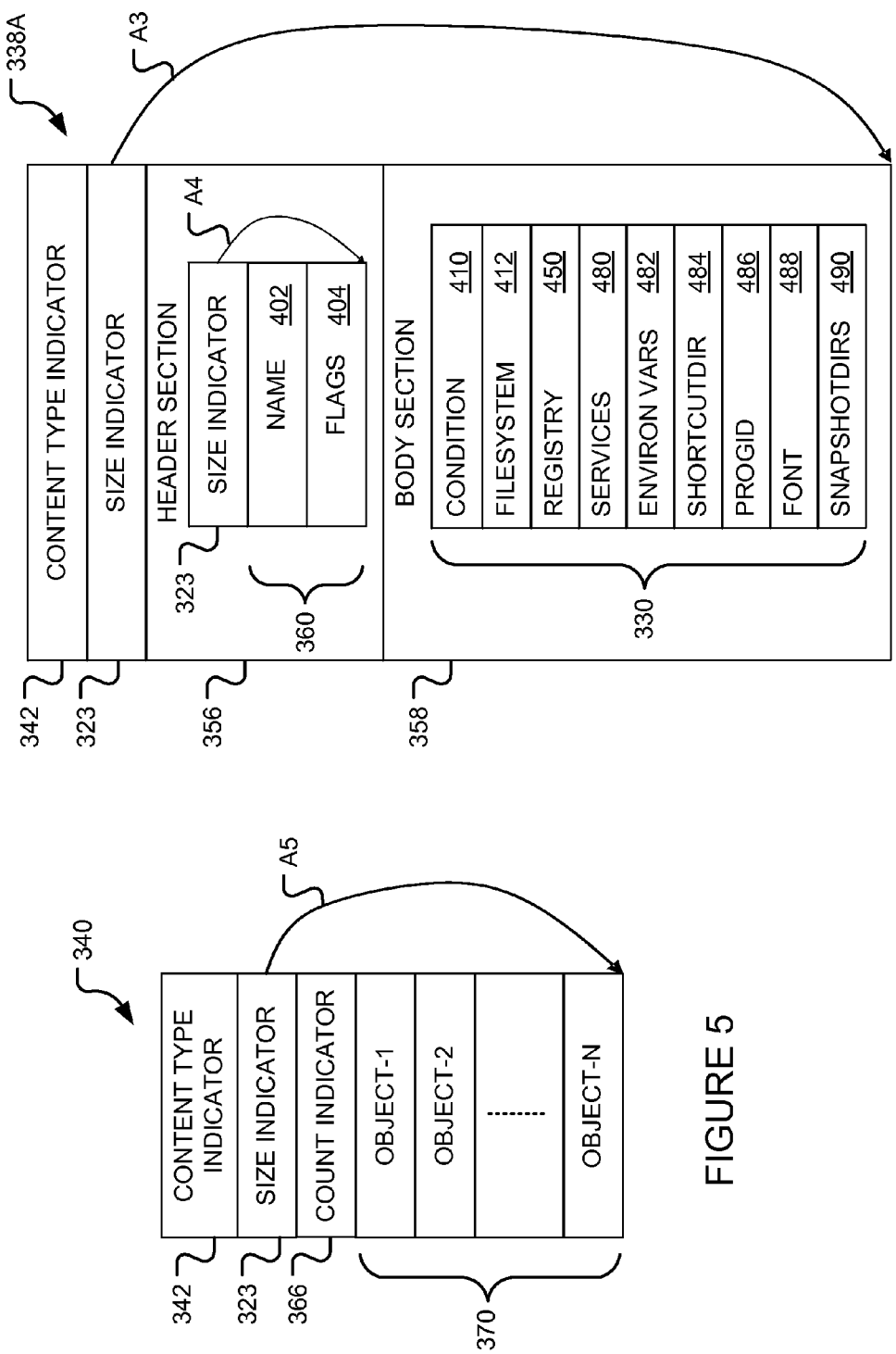

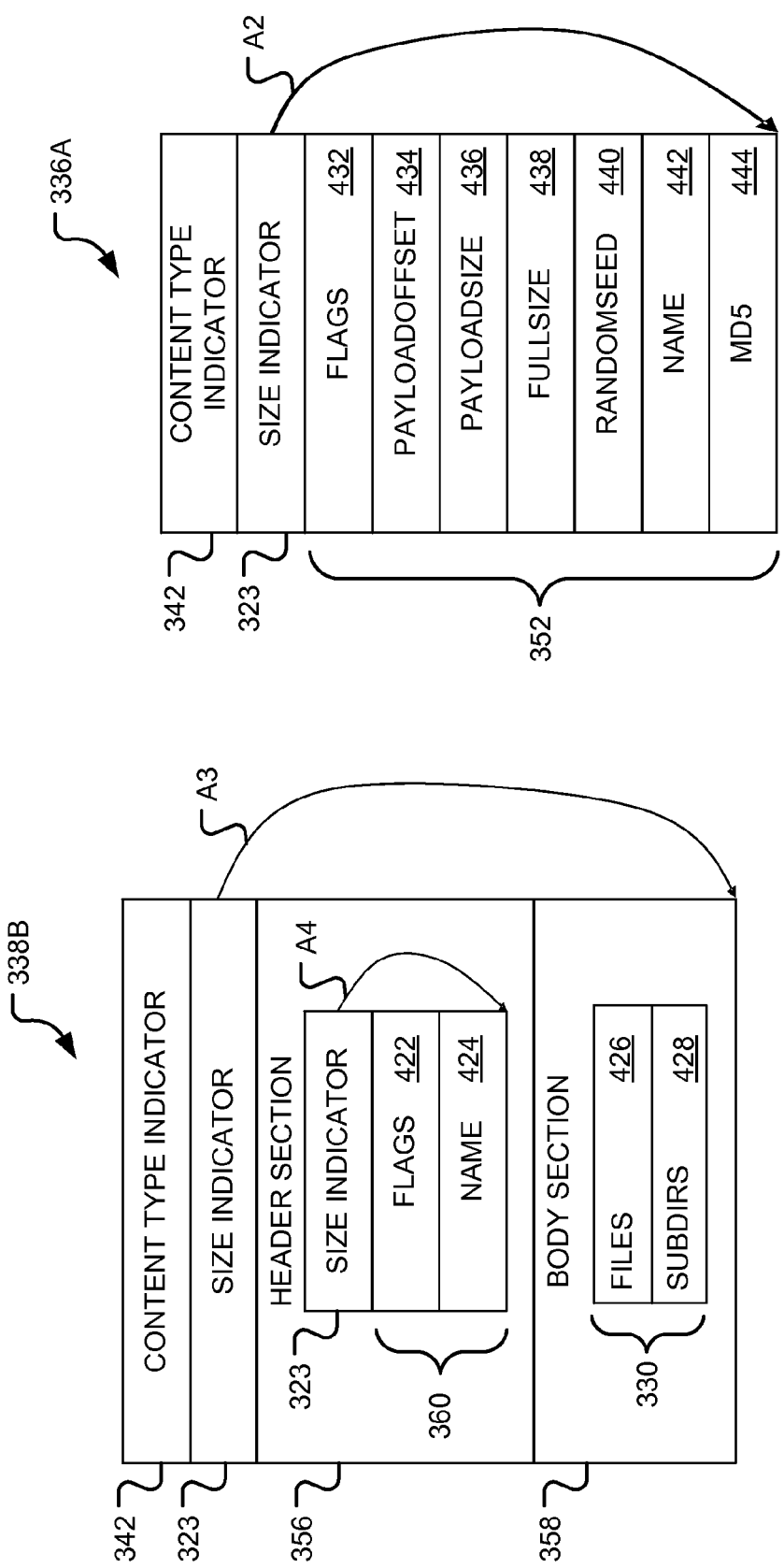

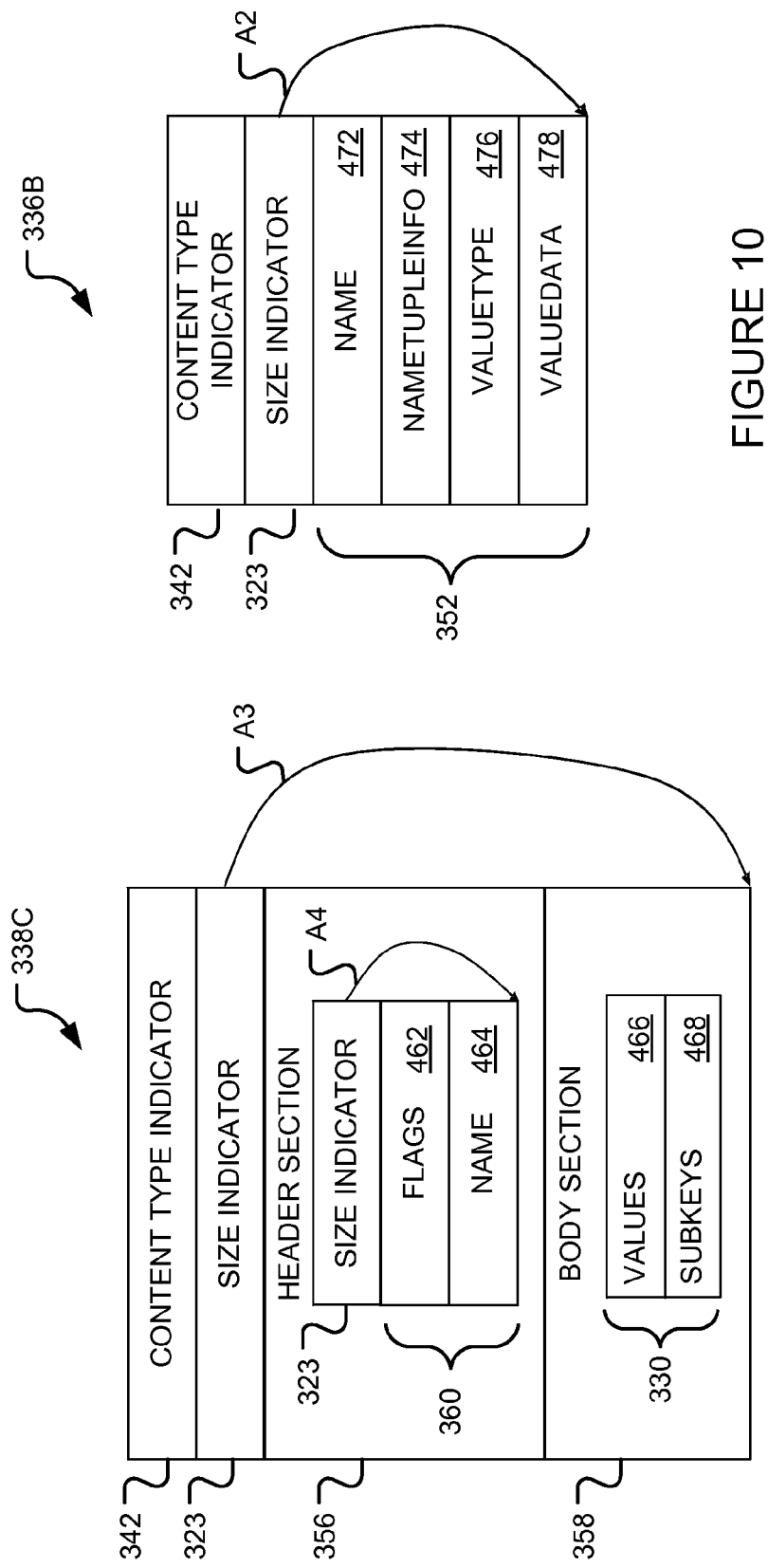

METHOD AND SYSTEM FOR IMPROVING STARTUP PERFORMANCE AND INTEROPERABILITY OF A VIRTUAL APPLICATION

BACKGROUND OF THE INVENTION

1. Field of the Invention

The present invention is directed generally to file formats and data structures used to implement application virtualization.

2. Description of the Related Art

A virtual application is a virtual machine image pre-configured with all of the files, registry data, settings, components, runtimes, and other dependencies required for a specific application to execute immediately and without installation on a host computing device. The virtual application is partially isolated from other applications implemented on a host computing device and partially isolated from an underlying host operating system installed and executing on the host computing device. The virtual application is encapsulated from the host operating system by a virtual runtime environment, which includes a virtual operating system, that receives operations performed by the virtualized application and redirects them to one or more virtualized locations (e.g., a virtual filesystem, virtual registry, and the like).

Thus, the virtual application may be conceptualized as including two components: a virtualization runtime and a virtual application configuration. The virtualization runtime implements the virtual runtime environment, which implements various operating system application programming interfaces ("APIs") in such a way that allows the executing virtual application to access and interact with items that may not be present on the host computer. The virtual application configuration includes data necessary to implement the virtual application within the virtualization runtime.

The virtual application is stored in and implemented by one or more data files and/or executable files. Depending upon the implementation details, the one or more data files and/or executable files storing and implementing the virtual application may include blocks of data corresponding to each application file of a natively installed version of the application. Herein, these blocks of data will be referred to as "virtual application files." The one or more data files and/or executable files storing and implementing the virtual application also include configuration information.

The data files and/or executable files are configured to execute within a virtual runtime environment that is provided at least in part by the virtual operating system. When the virtual application is executed within the virtual runtime engine, the configuration information is used to configure the virtual operating system to execute the virtual application. For example, the configuration information may contain information related to the virtual application files, virtual registry entries, environment variables, services, and the like. The virtual operating system is configured to communicate with the host operating system as required to execute the virtual application on the host computing device.

As is apparent to those of ordinary skill in the art, to execute the virtual application, the virtual runtime engine reads the configuration information and the virtual application files stored in the data file(s) and/or executable file(s). Thus, an amount of time required to execute the virtual application is determined at least in part by how efficiently the reader can access data stored in the data file(s) and/or executable file(s). File formats that enable efficient data access by the reader of the virtual runtime engine are desirable. To reduce an amount of time required to startup a virtual application, a need exists for a file format configured to identify portions that may be skipped initially and read at a later time. Further, compatibility of a particular virtual application with a particular version of the virtual runtime engine is determined at least in part by the format of the data file(s) and/or executable file(s). Therefore, a need exists for file formats configured to provide forward and/or backward compatibility. The present application provides these and other advantages as will be apparent from the following detailed description and accompanying figures.

BRIEF DESCRIPTION OF THE SEVERAL VIEWS OF THE DRAWING(S)

FIG. 3 is a simple format for use by a simple object.

FIG. 4 is a complex format for use by a complex object.

FIG. 5 is a collection format for use by a collection of simple or complex objects.

FIG. 6 is a format for use by a Layer complex object.

FIG. 7 is a format for use by a Directory complex object.

FIG. 8 is a format for use by a File simple object.

FIG. 9 is a format for use by a RegKey complex object.

FIG. 10 is a format for use by a RegValue simple object.

DETAILED DESCRIPTION OF THE INVENTION

Figure 1:
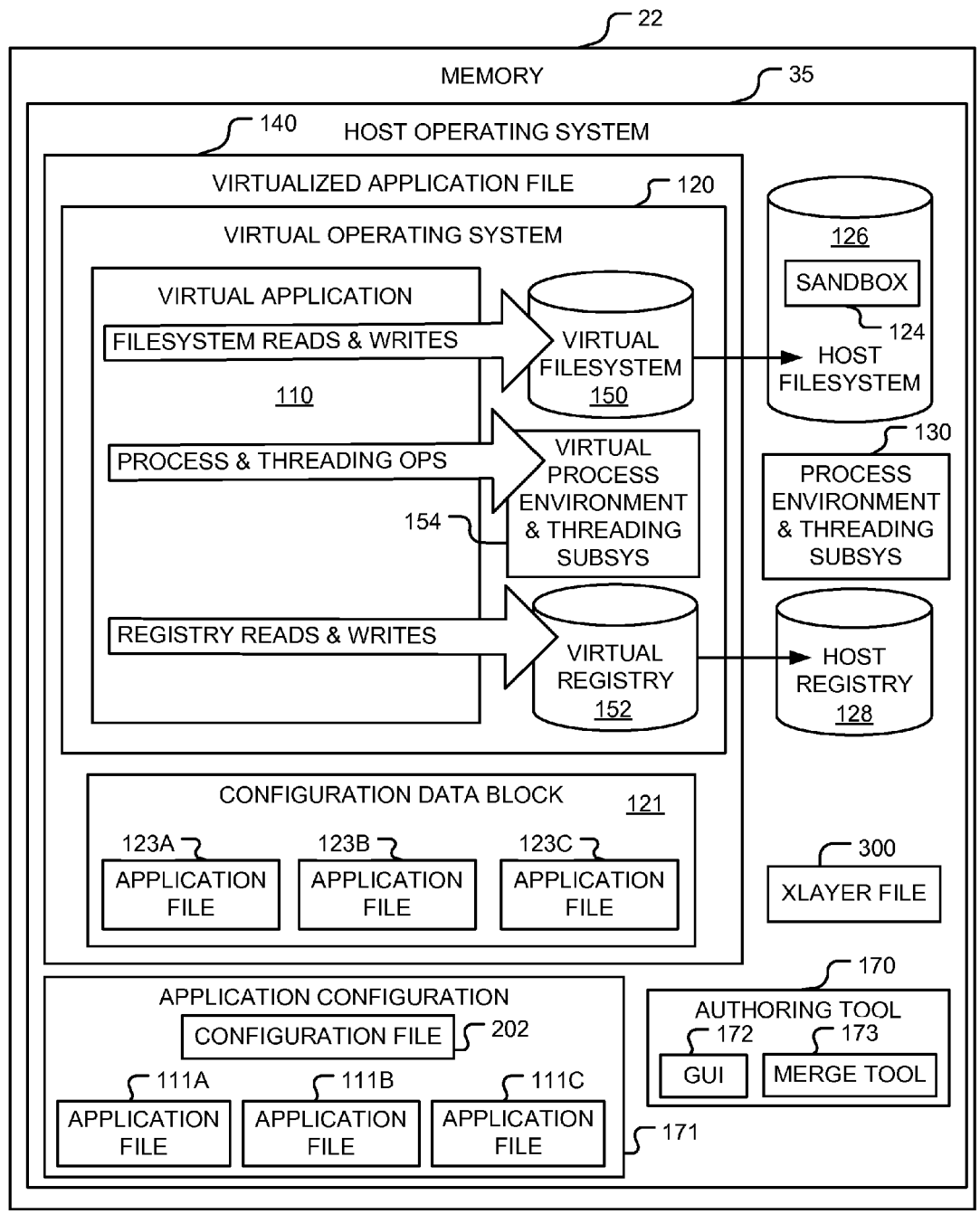
FIG. 1 is an illustration of a conceptualization of software components stored in memory and executing on a host computing device, the software components include a virtualized application file, and a virtual application authoring tool.

FIG. 1 illustrates a system memory 22 storing a conventional host operating system 35, that like most operating systems, includes a host filesystem 126, a host registry 128, and a process environment and threading subsystems component 130. FIG. 1 also illustrates an executable virtualized application file 140 stored in the system memory 22 and configured to execute on the host operating system 35, without having been installed on the host operating system 35.

In FIG. 1, the virtualized application file 140 includes components necessary to implement a virtual operating system 120 configured to execute in the host operating system 35 and a virtual application 110 configured to execute in the virtual operating system 120. In the embodiment illustrated a single virtual application file is used to implement both the virtual operating system 120 and the virtual application 110.

However, those of ordinary skill in the art appreciate that more than one virtual application file may be used to implement the virtual operating system 120 and the virtual application 110.

The virtual operating system 120 includes a virtual filesystem 150, virtual registry 152, and a virtual process environment and threading subsystems component 154. The virtual application 110 interacts with the virtual filesystem 150, virtual registry 152, and virtual process environment and threading subsystems component 154, instead of interacting directly with the host filesystem 126, the host registry 128, and the process environment and threading subsystems component 130 of the host operating system 35. The virtual operating system 120 is configured to communicate with the host operating system 35 as required to execute the virtual application 110.

The virtual application 110 executes inside a virtual runtime environment provided at least in part by the virtual operating system 120. Some virtual applications require one or more additional runtime environments to execute. For example, to execute a Flash application, the Flash runtime engine must also be installed. Therefore, to virtualize a Flash application, both the Flash application and Flash runtime engine must be included in the virtualized application file 140 and configured to execute in the portions of the virtual runtime environment provided by the virtual operating system 120. Collectively, all runtime components necessary to execute the virtual application 110 will be referred to as a virtual runtime engine. However, those of ordinary skill in the art appreciate that the virtual runtime engine may include only the virtual operating system 120 and components of other additional runtime engines (e.g., the Flash runtime engine) required to execute the virtual application 110 may be loaded separately by the virtual operating system 120. When executed, the virtual runtime engine generates, at least in part, the virtual runtime environment in which the virtual application 110 executes.

A natively installed version of an application is configured to execute within a runtime environment provided at least in part by the host operating system 35. Typically, to execute within the runtime environment provided at least in part by the host operating system 35, a natively installed version of an application modifies the configuration and settings of the host operating system 35. For example, the natively installed version may install dynamic link libraries or change registry settings of the host operating system 35. In contrast, a virtual version of the same application may be executed on the host operating system 35 without installation on the host operating system 35. Thus, the virtual application 110 does not modify the configuration or settings of the host operating system 35. For example, to execute the virtual application 110, dynamic link libraries ("dlls"), data files, registry settings, environment variables, and the like need not be modified on to the host operating system 35.

The virtualized application file 140 includes virtualized application files 123A-123C corresponding to application files 111A-111C of a natively installed version of the same application. The virtualized application files 123A-123C are stored as blocks of data inside a configuration data block 121. During execution, the virtualized application files 123A-123C are accessed via the virtual filesystem 150. The virtualized application files 123A-123C include one or more startup executables. The virtualized application file 140 identifies one or more startup executables that are executed when the virtual application 110 is first executed. The startup executables may be identified in the configuration data block 121.

When the virtualized application file 140 is executed, the configuration data block 121 is used to configure the virtual operating system 120 to execute the virtual application. For example, the configuration data block 121 may contain configuration information related to the files in the virtual filesystem 150 (e.g., the virtualized application files 123A-123C), entries in the virtual registry 152, environment variables, services, and the like. The configuration data block 121 may also include basic application metadata and settings such as the application name, application version, and sandbox location. Further, the configuration data block 121 may provide isolation information to the virtual operating system 120. This information indicates which virtualized application files 123A-123C, virtual registry keys, virtual registry values, environment variables, and services are to be isolated from the host operating system 35.

The configuration data block 121 may also include one or more virtual layers. Each virtual layer may identify files, registry entries, environment variables, and services. As the virtual layers are read, the corresponding files, registry entries, environment variables, and services are added to appropriate runtime data-structures. If the virtualized application file 140 is configured to execute on more than one host operating system, the configuration data block 121 may include a virtual layer for each operating system. In such an embodiment, each virtual layer includes information necessary to configure the virtual runtime environment to execute on a particular operating system. Further, the configuration data block 121 may include a virtual layer that includes configuration information common to the other virtual layers (e.g., a "default" virtual layer).

To execute the virtual application 110, an initialization process is first performed. During this process, the virtual operation system 120 is launched and configured by the configuration data block 121. A component of the virtual runtime engine referred to as a "reader" reads data stored in the configuration data block 121 and uses that data to configure the virtual runtime environment. For example, the reader reads the virtual layer for the host operating system 35 and any other applicable virtual layers and uses the information read to configure the virtual operation system 120 (and in some implementations, other components of the virtual runtime environment) to execute the virtual application 110 on the host operating system 35. The virtual filesystem 150 may be configured to mirror a host filesystem configured to execute a natively installed version of the application. Similarly, the virtual registry 152 may be configured to mirror a host registry configured to execute a natively installed version of the application.

After the initialization process has completed, the appropriate startup executable(s) is/are launched inside the virtual operating system 120. The virtual operating system 120 intercepts calls to the host operating system 35 and routes them to corresponding components of the virtual operating system 120. For example, when the virtual application 110 requests to access an application file using a path of a natively installed version of the application, the virtual operating system 120 intercepts the request and routes the request to one of the virtualized application files 123A-123C corresponding to the application file requested. The virtual operating system 120 may also route some requests and actions to the host operating system 35 for processing.

The virtualized application file 140 is read-only and when executed, cannot be modified by the virtual application 110 or components of the virtual runtime engine. Therefore, modifications to the data stored in the configuration data block 121 (e.g., modifications to the virtualized application files 123A-

123C, modifications to the registry keys of the virtual registry 152, and the like) are written to a readable and writable memory location referred to herein as a sandbox 124. The sandbox 124 is a location on the host filesystem 126, a network share, a removable storage device, and the like whereat files may be created, modified, and deleted by the virtual application 110 at runtime. For example, when the virtual operating system 120 needs to create, modify, or delete a virtualized application file, the virtual operating system does so in the sandbox 124. Similarly, if the virtual application 110 modifies a virtual registry value, the virtual registry value is changed in the sandbox 124. The virtual operating system 120 may also route some requests and actions to the host operating system 35 for processing.

U.S. patent application Ser. No. 12/188,155, filed on Aug. 7, 2008, now pending; U.S. patent application Ser. No. 12/188,161 filed on Aug. 7, 2008, now pending; and U.S. patent application Ser. No. 12/685,576 filed on Jan. 11, 2010, now pending; all of which are incorporated herein by reference in their entireties, disclose systems that may be used to create and configure the virtualized application file 140. As described in greater detail in 20 U.S. patent application Ser. Nos. 12/188,155, 12/188,161, and 12/685,576, the virtualized application file 140 may be created by a virtual application executable constructor or authoring tool 170 using an application template that includes copies of files, such as a configuration file 202, application files 111A-111C, and the like, used to configure the virtualized application file 140. However, the template is not a requirement. Instead, to build the virtualized application file 140, the authoring tool 170 needs only the configuration file 202 and copies of any applications files 111A-111C necessary for a natively installed version of the application to execute. The applications files 111A-111C, and the configuration file 202 are referred to collectively as an application configuration 171.

The authoring tool 170 combines the application configuration 171 and the components of the virtual runtime engine (e.g., the virtual operating system 120) into the executable virtualized application file 140. Sometimes multiple virtual applications share a common set of virtual machine configuration settings or virtual runtime engine components. By way of a non-limiting example, multiple Flash applications may be configured to be executed by the same Flash runtime engine. Further, system administrators may want to share a common set of configuration options (e.g., browser bookmarks, application settings, etc.) across a department or enterprise. These settings may be stored in a file, referred to as an xlayer file 300, and incorporated into one or more virtual application files at runtime by the virtual runtime engine. Depending upon the implementation details, the authoring tool 170 may be used to create the xlayer file 300.

The xlayer file 300 cannot be executed directly from the host operating system 35 and instead requires the virtual runtime environment supplied at least in part by the virtual operating system 120. Like the configuration data block 121, the xlayer file 300 may be read by the reader of the virtual runtime engine at runtime. The information stored within the xlayer file 300 may be made available to a virtual application (e.g., the virtual application 110) via the virtual filesystem 150 and virtual registry 152 of the virtual operating system 120 at runtime. By way of a non-limiting example, the configuration data block 121 may specify a location on the host filesystem 126 whereat the virtual runtime engine (e.g., the virtual operating system 120) is configured to look for xlayer files. If an xlayer file is located in the specified location, the xlayer file 300 may be read automatically by the reader of the virtual runtime environment. Alternatively, the virtual runtime engine may be configured to look for xlayer files in a particular location each time the virtual application 110 is executed.

The xlayer file 300 may be shared between users and used to supply virtual machine settings to multiple virtual applications. The xlayer file 300 may include all virtual registry and virtual filesystem information associated with a particular software component (e.g., a virtual runtime engine component), allowing the component to be fully installed in the virtual runtime environment. The xlayer file 300 may be implemented as a binary file. The data in the xlayer file 300 may be organized in one or more virtual layers substantially similar to the virtual layers of the configuration data block 121 described above.

As is apparent to those of ordinary skill in the art, the number of files and registry keys needed to implement a virtual application (such as the virtual application 110) and/or a component encoded in the xlayer file 300 can be very large. For example, it is not uncommon for the number of files and registry keys needed to implement a virtual application to total in the tens of thousands. Therefore, the performance characteristics of the configuration data block 121 and the xlayer file 300 can affect the performance of the virtual application 110 significantly. In other words, the performance characteristics of the configuration data block 121 and/or the xlayer file 300 can increase or decrease the startup time for the virtual application 110.

Figure 2:
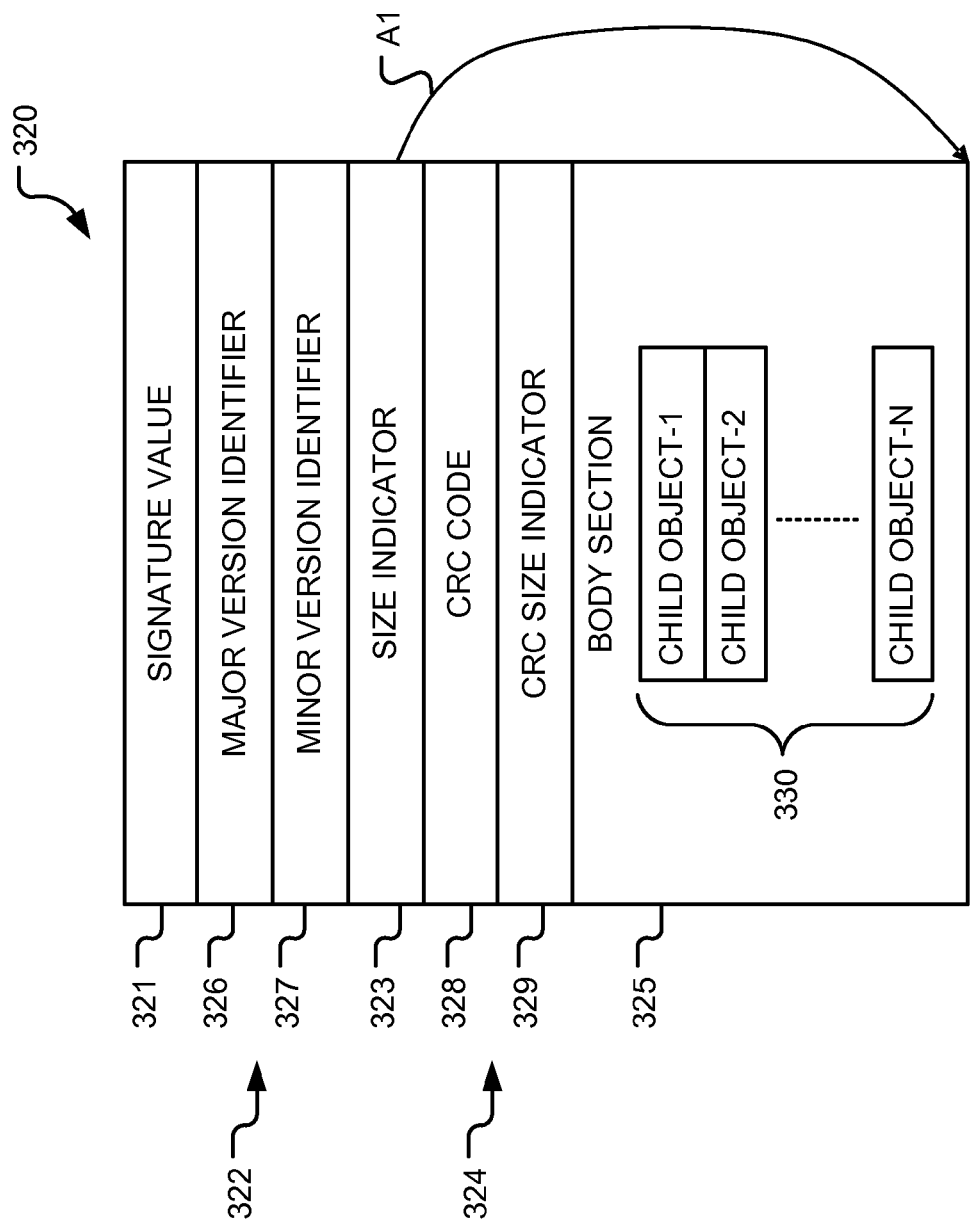
FIG. 2 is a file format for use by a configuration data block and/or an xlayer file of FIG. 1.

As is apparent to those of ordinary skill in the art, the configuration data block 121 and the xlayer file 300 store similar data and therefore, can be formatted in accordance with a common format. FIG. 2 illustrates a file format 320 that may be used to configure the configuration data block 121 portion of the executable virtualized application file 140 and/or the xlayer file 300.

Typically, as operating systems are updated, new operating system features need to be virtualized to support new classes of applications. In other words, the virtual operating system 120 may be updated to support new applications. When this occurs, the file format 320 may need to be reconfigured to execute within the updated virtual operating system. Therefore, the file format 320 illustrated in FIG. 2 is configured to be readily reconfigurable.

It may be desirable to avoid modifying the file format 320 after it has been created to avoid forward and backward incompatibility issues with newer and older versions of the virtual runtime engine. In other words, the file format 320 should be compatible with the virtual operating system 120 despite modifications made to the file format 320. Additionally, it may be advantageous to separate the components implementing the virtualization runtime environment (e.g., the components of the virtual operating system 120) from the data stored in the file format 320. This separation allows updates to be made to the virtualization runtime environment without also requiring a re-build of the virtualized application file 140 and/or the xlayer file 300.

Sometimes, a user may wish to execute or load multiple virtualized application files and/or xlayer files in one virtualization runtime environment to allow multiple virtual applications to interact or interoperate with one another. Therefore, the file format 320 may be configured to be parsed quickly and to be forward and backward compatible with different versions of the virtualization runtime environment. For example, the file format 320 may include strongly-typed data and size encoding to improve performance and interoperability between virtual applications.

The file format 320 includes a signature value 321, a version stamp 322, a size indicator 323, an error checking section 324, and a body section 325. The data in file format 320 is ordered with the signature value 321 being first followed by the version stamp 322, which is followed by the size indicator 323, which is followed by the error checking section 324, which is followed by the body section 325. The body section 325 may include any number of child objects 330.

The signature value 321 is a value used to authenticate the information stored in a file. The signature value 321 may be implemented as a block of six bytes of data. The value stored in the signature value 321 may be generated using any method and the present teachings are not limited to use with a signature value generated by any particular method.

The version stamp 322 may include a major version identifier 326 and a minor version identifier 327. The major version identifier 326 should be modified if a change is made to the file format 320 that would make the file incompatible with a previous version of the virtual runtime engine. The minor version identifier 327 may be incremented for informational purposes when a new content type is added to the file format 320, or for other minor modifications to the file format 320. Each of the major and minor version identifiers 326 and 327 may be implemented as 32-bit integers.

The size indicator 323 identifies a location in memory that corresponds to the end of a file having the file format 320. The location in memory to which the size indicator 323 refers is identified in FIG. 2 by a curved arrow "A1." By way of a non-limiting example, the size indicator 323 may be implemented as a 32-bit integer.

By way of a non-limiting example, the error checking section 324 may be implemented using a cyclic redundancy check ("CRC") method. In such an embodiment, the error checking section 324 may include a CRC code 328 and a CRC size indicator 329. Each of the CRC code 328 and the CRC size indicator 329 may be implemented as 32-bit integers.

The CRC code 328 may be created using a simple XOR based CRC function. The CRC size indicator 329 may indicate on how many bytes the CRC function is performed. By way of a non-limiting example, the CRC function may be performed on a number of bytes specified by the CRC size indicator 329 starting with the bytes of the CRC size indicator 329. By performing the CRC function on fewer than all of the bytes following the CRC size indicator 329, error checking may be performed on more sensitive data stored nearer the beginning of the virtualized application file 140 or the xlayer file 300. For example, if a child object named "Object-1" stores licensing data, it may be desirable for that data to be tamper resistant. However, subsequent data (e.g., the data stored in a child object named "Object-N") may be less sensitive to tampering. Therefore, performance may be improved by limiting error checking to only data sensitive to errors. In other words, this technique may be used to reduce initial costs (e.g., processor time) associated with validating the data stored in the virtualized application file 140 and/or the xlayer file 300.

The body section 325 includes a number of child objects 330. Each of the child objects 330 has a simple format 336 (illustrated in FIG. 3), a complex format 338 (illustrated in FIG. 4), or a collection format 340 (illustrated in FIG. 5). Referring to FIGS. 3-5, an object having the simple format 336 is referred to as a "simple object," and an object having the complex format 338 is referred to as a "complex object." The collection format 340 is configured to store a collection of simple or complex objects.

Each of the simple, complex, and collection formats 336, 338, and 340 includes a content type indicator 342 and the size indicator 323. The content type indicator 342 is positioned first in each of the simple, complex, and collection formats 336, 338, and 340 and indicates whether an object has the simple format 336, the complex format 338, or the collection format 340. By way of a non-limiting example, an object may be identified as having the collection format 340 when a highest-order bit in the content type indicator 342 is set. In such an embodiment, if the highest-order bit is not set, the object has the simple format 336 or the complex format 338.

The content type indicator 342 identifies the type of data stored in the object. Further, the content type indicator 342 indicates which data items (other than the content type indicator 342 and the size indicator 323) are included in the object. For example, as shown in FIG. 8, when the content type indicator 342 indicates the content type of an object is "File" (see Table A below), the object has the simple format 336 configured to store seven data items other than the content type indicator 342 and the size indicator 323. This format is referred to as a "File simple format" and has been identified in FIG. 8 by reference numeral 336A. On the other hand, as shown in FIG. 10, when the content type indicator 342 indicates the content type of an object is "RegValue" (see Table A below), the object has the simple format 336 configured to store four data items other than the content type indicator 342 and the size indicator 323. This format is referred to as a "RegValue simple format" and has been identified in FIG. 10 by reference numeral 336B.

Non-limiting examples of other types of content are provided in a leftmost column of Table A below. The rightmost column of Table A indicates in which format, the simple format 336 or the complex format 338, the content may be stored. By way of a non-limiting example, the content type indicator 342 may be implemented as a 32-bit integer.

TABLE A

| Content Type | Object Format |
| --- | --- |
| ConfigBase | Simple |
| Licensing | Simple |
| AppMetadata | Simple |
| Splash | Simple |
| MessageStrings | Simple |
| StartupFile | Simple |
| ChildProcessException | Simple |
| Layer | Complex |
| LayerCondition | Simple |
| Directory | Complex |
| File | Simple |
| RegKey | Complex |
| RegValue | Simple |
| ShortcutDir | Complex |
| Shortcut | Simple |
| ProgId | Complex |
| Extension | Complex |
| Verb | Simple |
| Service | Simple |
| EnvironmentVariable | Simple |
| Font | Simple |
| ShimInfo | Simple |
| XLayersInfo | Simple |
| SnapshotDirectory | Simple |

Each of the simple and complex formats 336 and 338 also includes the size indicator 323. The size indicator 323 identifies a location in memory that corresponds to the end of the object. By way of a non-limiting example, the size indicator 323 may be implemented as a 32-bit integer.

Turning to FIG. 3, the simple format 336 includes the content type indicator 342, the size indicator 323, and a predetermined sequence 352 of data items each having a simple data type. The term "simple data type" refers to basic data types such as integers, strings, flags, Booleans, byte arrays, and the like. In the embodiment illustrated, the data in a simple format 336 is ordered with the content type indicator 342 being first followed by the size indicator 323, which is followed by the predetermined sequence 352 of data items. The sequence 352 illustrated includes simple data types named "DATA-1," "DATA-2," . . . "DATA-N." The location in memory to which the size indicator 323 refers is identified in FIG. 3 by a curved arrow "A2."

Referring to FIG. 4, the complex format 338 includes the content type indicator 342, the size indicator 323, a header section 356, and a body section 358. In the embodiment illustrated, the data in the complex format 338 is ordered with the content type indicator 342 being first followed by the size indicator 323, which is followed by the header section 356, which in turn is followed by the body section 358. The location in memory to which the size indicator 323 refers is identified in FIG. 4 by a curved arrow "A3."

The format of the header section 356 is similar to the simple format 336 but omits the content type indicator 342. Specifically, the header section 356 includes the size indicator 323 followed by a predetermined sequence 360 of data items each having a simple data type. The sequence 360 illustrated includes simple data types named "DATA-1," "DATA-2," . . . "DATA-N." The location in memory to which the size indicator 323 in the header section 356 refers is identified in FIG. 4 by a curved arrow "A4." The header section 356 stores information related to the complex object itself.

The body section 358 includes any number of child objects 362. The child objects 362 illustrated include objects named "CHILD OBJECT-1," "CHILD OBJECT-2," . . . "CHILD OBJECT-N." Each of the child objects 362 may have the simple format 336, the complex format 338, or the collection format 340. Therefore, each of the child objects 362 includes the content type indicator 342 and the size indicator 323.

Referring to FIG. 5, the collection format 340 includes the content type indicator 342, the size indicator 323, a count indicator 366, and a number of collection objects 370. In the embodiment illustrated, the data in the collection format 340 is ordered with the content type indicator 342 being first followed by the size indicator 323, which is followed by the count indicator 366, which is followed by the collection objects 370. The collection objects 370 illustrated include objects named "OBJECT-1," "OBJECT-2," . . . "OBJECT-N."

As mentioned above, an object has the collection format 340 when the highest-order bit of the content type indicator 342 is set. When the highest-order bit of the content type indicator 342 is set, the lower order bits of the content type indicator 342 indicate the format of the data stored in the collection objects 370. For example, when the highest-order bit is set and the lower order bits indicate the content type of the collection object is "File" (see Table A above), each of the objects in the collection objects 370 has the File simple format 336A illustrated in FIG. 8. Thus, each of the collection objects 370 has the content type identified by the content type indicator 342 of the collection.

The size indicator 323 refers to an address of the last object in the collection objects 370. The location in memory to which the size indicator 323 refers is identified in FIG. 5 by a curved arrow "A5."

The count indicator 366 indicates how many collection objects 370 are in a collection. By way of a non-limiting example, the count indicator 366 may be implemented as a 32-bit integer.

Each of the collection objects 370 has the simple format 336, the complex format 338, or the collection format 340. Therefore, each of the collection objects 370 includes the content type indicator 342 and the size indicator 323.

Referring to FIGS. 2 and 4, the body section 325 of the file format 320 resembles the body section 358 (see FIG. 4) of a complex format 338 and may include any number of child objects 330. Referring to FIGS. 2-5, the child objects 330 of the file format 320 may have the simple format 336, the complex format 338, or the collection format 340. The minor version identifier 327 of the file format 320 may be incremented for informational purposes when a new simple element is added to the simple format 336 of a preexisting content type, a simple element is added to the header section 356 of the complex format 338 for a particular content type, or a new child object is added to the body section 358 of the complex format 338 for a particular content type.

As explained above, referring to FIG. 1, the data in the virtualized application file 140 and/or the xlayer file 300 may include one or more virtual layers. As shown in Table A, when the content type indicator 342 indicates the content type is "Layer," the object has the complex format 338 configured to store virtual layer data. This format is referred to as a "Layer complex format" and has been identified in FIG. 6 by reference numeral 338A.

By way of a non-limiting example, the virtualized application file 140 and/or the xlayer file 300 may include a virtual layer for each different host operating system or host runtime environment on which the virtual application 110 is configured to be executed. Further, as explained above, the virtual application 110 may be implemented using one or more executable files and/or xlayer files. Therefore, to execute a single virtual application, the reader of the virtual runtime engine may need to parse more than one complex object having the Layer complex format 338A.

The Layer complex format 338A stores information used to configure the virtual filesystem 150 and the virtual registry 152. In the header section 356, the layer format 338A has a name indicator 402 for storing the name of the virtual layer and a flags indicator 404. The flags indicator 404 indicates whether an object having the Layer complex format 338A is a "System" layer. A "System" layer includes items (such as a licensing module) used by the virtual runtime engine. These items may be created by the authoring tool 170. In particular implementations, the items are not authored by the authoring tool 170 and not by a user. In the body section 358, the Layer complex format 338A includes nine child objects 330.

A first child object 410 named "Condition" is a simple object of type "LayerCondition" (see Table A above). This object specifies a condition for including or excluding the content of the parent Layer complex object. For example, the condition may identify a particular operating system and whether to include or exclude the parent Layer complex object depending upon whether the host operating system 35 is the particular operating system specified.

A second child object 412 named "FileSystem" is a collection of objects having the content type "Directory" (see Table A above). Objects having the content type "Directory" are referred to herein as "Directory complex objects." As indicated in Table A above, an object having the content type "Directory" has the complex format 338 (see FIG. 4) configured to store directory information. This format is referred to as a "Directory complex format" and has been identified in FIG. 7 by reference numeral 338B. Therefore, in the second child object 412, each of the child objects 370 has the Directory complex format 338B.

As is apparent to those of ordinary skill in the art, files and directories are organized in the virtual filesystem 150 in a hierarchical structure with a root directory (storing files and subdirectories) located at the base of the hierarchy and nodes (subdirectories) linked to the root directory. The collection of Directory complex objects of the second child object 412 stores subdirectories used to configure a root directory of the virtual filesystem 150. The collection of Directory complex objects may be configured to mirror the subdirectories stored in a root directory by a natively installed version of the application. If the virtual application 110 is executed using more than one virtual layer, each virtual layer may configure a portion of the same root directory. Alternatively, two or more of the virtual layers may configure subdirectories within the virtual filesystem 150. Referring to FIG. 7, each of the Directory complex objects of the second child object 412 (see FIG. 6) corresponds to a subdirectory and has the Directory complex format 338B.

The Directory complex format 338B includes a flags indicator 422 and a name indicator 424 in the header section 356. The flags indicator 422 indicates one or more values assigned to properties of the subdirectory in the virtual filesystem 150. By way of non-limiting examples, the flags indicator 422 may include bits indicating which of the following flags have been set to "TRUE:" isolated, merged, empty, read-only, and hidden. When the flag "isolated" is set to "TRUE," the directory is isolated from the host operating system 35. When the flag "merged" is set to "TRUE," the directory is merged with a corresponding directory on the host filesystem 126. When the flag "empty" is set to "TRUE," the directory is empty (i.e., the directory does not include any files or subdirectories). When the flag "read-only" is set to "TRUE," the contents of the directory are read-only. When the flag "hidden" is set to "TRUE," the directory is hidden. The flags indicator 422 may be implemented as a 32-bit integer.

The name indicator 424 indicates the name of the subdirectory to which the Directory complex object corresponds. The name indicator 424 may be implemented as a string.

In the body section 358, each of the Directory complex objects of the second child object 412 includes a collection 426 of simple objects of the type "File" ("File simple objects") and a collection 428 of Directory complex objects.

Each of the File simple objects of the collection 426 corresponds to a file stored in the subdirectory to which its parent Directory complex object corresponds. Referring to FIG. 8, each of the File simple objects has a File simple format 336A that includes a flags indicator 432, a PayloadOffset indicator 434, a PayloadSize indicator 436, a FullSize indicator 438, a RandomSeed indicator 440, a name indicator 442, and a MD5 field 444.

The flags, PayloadOffset, PayloadSize, FullSize, and RandomSeed indicators 432, 434, 436, 438, and 440 may be implemented as 32-bit integers. The PayloadOffset indicator 434 indicates a location of the start of the block of data (or "payload") corresponding to a location in memory whereat the data stored in the File simple object begins. Thus, the PayloadOffset indicator 434 refers to an offset whereat bytes of file data begin. These bytes may be raw or compressed. The PayloadSize indicator 436 indicates the size of the payload starting at the location stored in the PayloadOffset indicator 434. The FullSize indicator 438 indicates an uncompressed size of the data stored in the File simple object. The value of the FullSize indicator 438 will be the same as value of the PayloadSize indicator 436 when the bytes of file data are not compressed.

The RandomSeed indicator 440 may be used to obfuscate the contents of the data stored in the File simple object. In this manner, files may be less recognizable within the virtualized application file 140 and/or the xlayer file 300. The RandomSeed indicator 440 may be used to perform a function or transform (e.g., XOR) on the bytes of file data. For example, an XOR function may be used on the RandomSeed indicator 440 and the first byte of the file data. After each XOR operation, a result of the operation may be used to compute a new seed value (e.g., using a simple pseudo-random sequence generating function) that may be used on the next byte of file data.

The MD5 field 444 stores a hash value that may be used as a unique identifier for the data stored in the File simple object. By way of another non-limiting example, the MD5 field 444 may be used determine whether the data stored in the File simple object includes an error. The MD5 field 444 may be implemented as a blob (e.g., a blob of 16 bytes).

The name indicator 442 stores the name of the file. The name indicator 442 may be implemented as a string.

Returning to FIG. 7, subdirectories within the subdirectories of the root directory may be stored within one or more of the Directory complex objects stored within the collection 428 of Directory complex objects. In other words, the Directory complex objects used to configure the virtual filesystem 150 may be nested and used to configure a hierarchical directory structure.

Returning to FIG. 6, a third child object 450 is a collection of complex objects of type "RegKey" ("RegKey complex objects). In the third child object 450, each of the child objects 370 is a RegKey complex object and has the RegKey complex format 338C illustrated in FIG. 9. As is apparent to those of ordinary skill in the art, key and key values are organized in the virtual registry 152 in a hierarchical structure have a root node storing keys at the base of the hierarchy. Sub-keys or sub-nodes are linked to the root node. The third child object 450 stores the keys used to configure the root node of the virtual registry 152. Each of the RegKey complex objects of the third child object 450 corresponds to a key. If the virtual application 110 is executed using more than one virtual layer, each virtual layer may configure a portion of the same root node of the virtual registry 152. Alternatively, two or more of the layers may configure different sub-nodes (or sub-keys) of the virtual registry 152.

Referring to FIG. 9, the RegKey complex format 338C includes a flags indicator 462 and a name indicator 464 in the header section 356. The flags indicator 462 may be substantially similar to the flags indicator 422 (see FIG. 7). The flags indicator 462 indicates one or more values assigned to properties of the registry key in the virtual registry 152. By way of non-limiting examples, the flags indicator 462 may include bits indicating which of the following flags have been set to "TRUE:" isolated, merged, empty, read-only, and hidden. However, depending upon the implementation details, the flags indicator 462 may exclude the hidden flag. The flags indicator 462 may be implemented as a 32-bit integer.

The name indicator 464 indicates the name of the key to which the RegKey complex object corresponds. The name indicator 464 may be implemented as a string.

In the body section 358, each of the RegKey complex objects includes a collection 466 of simple objects of the type "RegValue" (see Table A above) and a collection 468 of RegKey complex objects.

Each of the RegValue simple objects of the collection 466 corresponds to a registry value stored in the sub-key to which its parent RegKey complex object corresponds. Each of the RegValue simple objects of the collection 466 corresponds to a key value.

Referring to FIG. 10, a RegValue simple object has a RegValue simple format 336B that includes a Name indicator 472, a NameTupleInfo indicator 474, a ValueType indicator 476, and a ValueData field 472. The Name indicator 472 may be implemented as a string. The NameTupleInfo indicator 474 may be implemented as an array of 16-bit integers. The ValueData field 472 may be implemented as a string, a 32-bit integer, a 64-bit integer, or a blob (e.g., a blob of 16 bytes). The ValueType indicator 476 indicates the type of the ValueData field 472 and may be implemented as a 16-bit integer.

Additional sub-keys within the sub-keys of the root node may be stored within one or more of the RegKey complex objects stored within the collection 468 of RegKey complex objects of FIG. 9. In other words, the RegKey complex objects used to configure the virtual registry 152 may be nested and used to configure a hierarchical registry key structure.

Returning to FIG. 6, a fourth child object 480 is a collection of simple objects of type "Service" ("Service simple objects"). Each of the Service simple objects stores configuration information for a virtual service (e.g., a virtual Windows service). For example, SQL Server is a Windows service. Thus, the Layer complex object may include a Service simple object for SQL Server.

A fifth child object 482 is a collection of simple objects of type "EnvironmentVariable" ("EnvironmentVariable simple objects"). Each of the EnvironmentVariable simple objects stores configuration information for a virtual environment variable (e.g., a virtual Windows environment variable). For example, "PATH" is an environment variable typically used by a Windows operating system. Thus, the Layer complex object may include an EnvironmentVariable simple objects for the "PATH" environment variable.

A sixth child object 484 is a collection of simple objects of type "ShortcutDir" ("ShortcutDir complex objects"). Each of the ShortcutDir complex objects stores configuration information for a virtual shortcut folder (e.g., a virtual Windows shortcut folder typically located in a start menu). Shortcut simple objects may be included as child objects 362 (see FIG. 4) in a ShortcutDir complex object.

A seventh child object 486 is a collection of complex objects of type "ProgId" ("ProgId complex objects"). Each of the ProgId complex objects stores a virtual program identifier ("ProgId"), such as a virtual Windows ProgId. An example of a virtual Windows ProgId is Microsoft.Word.12. A ProgId uniquely identifies an "application" and is often used to associate an application with one or more file types and/or actions provided by the application.

A eighth child object 488 is a collection of simple objects of type "Font" ("Font simple objects"). A font file is a special file that provides all information needed to render a particular font or style of print, such as Times New Roman. Each of the Font simple objects stores a font file. The Font simple object is substantially similar to the File simple object but includes an additional property needed to "initialize" the font file at the startup of the virtual application.

A ninth child object 490 is a collection of simple objects of type "SnapshotDirectory" ("SnapshotDirectory simple objects"). Each of the SnapshotDirectory simple objects stores a path identifier and a folder identifier (such as an IdProgramFiles indicator). As is apparent to those of ordinary skill in the art, the authoring tool 170 (see FIG. 1) may be used to create the virtualized application file 140 and/or the xlayer file 300 on a first computing device. Then, these files may be executed a second different computing device. The path and folder identifiers are used to normalize any file path encountered at runtime that refers to a location on a computing device on which the virtual application 110 was configured (instead of a location on the second computing device). When such a path is encountered, it is replaced with a path on the second computing device using the path and folder identifiers of the SnapshotDirectory simple object.

Referring to FIGS. 3-5, as explained above, each of the simple, complex, and collection formats 336, 338, and 340 includes the content type indicator 342, and the size indicator 323. The content type indicator 342 is used to identify which type of data is stored in the object. Using the content type indicator 342, the virtual runtime engine identifies which portions of the virtualized application file 140 and/or the xlayer file 300 to expand and which portions to skip (or defer) for later expansion. In particular implementations, it may be beneficial to skip expansion of Directory complex objects and/or RegKey complex objects.

The reader of the virtual runtime engine uses the size indicators 323 to skip one or more portions of data stored in the virtualized application file 140 and/or the xlayer file 300. For example, some files (stored in File simple objects) and subdirectories (stored in Directory complex objects) of a Layer complex object, may be useful for desktop integration, but are not needed to execute the virtual application 110. During the virtual application startup routine, the reader may use the various size indicators 323 included in the simple, complex, and collection formats 336, 338, and 340 to skip over portions of the data useful for desktop integration.

Further, the size indicators 323 may be used to parse the portions of the virtualized application file 140 and/or the xlayer file 300 used to configure the virtual filesystem 150 and/or the virtual registry 152. For example, at initial startup, the Directory complex objects in the second child object 412 (i.e., the subdirectories) can be skipped, and offset placeholders stored for each Directory complex object that may be used later to expand skipped directories on demand. Further, the RegKey complex objects in the third child object 450 illustrated in FIG. 6 (i.e., the sub-keys) can be skipped, and offset placeholders stored for each RegKey complex object that may be used later to expand skipped sub-keys on demand. Only when the virtual application 110 actually needs to access the skipped subdirectories or sub-keys are those portions of the Layer complex object parsed. In this manner, expansion of nested subdirectories and sub-keys may be deferred at each level until the nested information is needed. This process may be characterized as a type of deferred recursion.

Deferred Expansion

Figure 11:
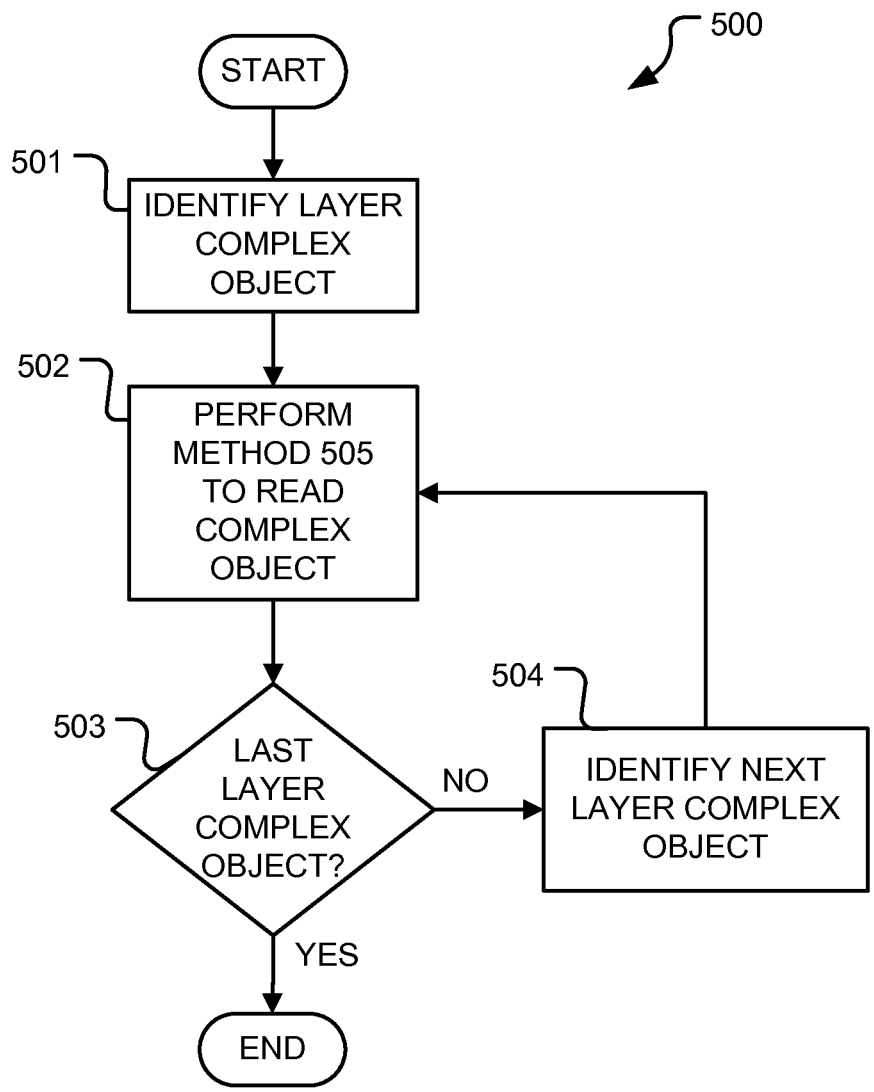
FIG. 11 is a method of reading a Layer complex object having the format of FIG. 6.

FIG. 11 is a flow diagram of an exemplary method 500 of reading the Layer complex objects used to configure the virtual runtime environment. The method 500 may be used to defer the parsing or reading of portions of a Layer complex object. With respect to a particular Layer complex object, the method 500 may be used to defer reading the collection objects 370 of the second child object 412 of FIG. 6 (i.e., the Directory complex objects) and/or the collection objects 370 of the third child object 450 of FIG. 6 (i.e., the RegKey complex objects).

In first block 501, the reader identifies a Layer complex object to read. In next block 502, the reader performs a method 505 described below to read or parse the Layer complex object identified in block 501. In decision block 503, the reader determines whether the Layer complex object identified in block 501 is the last Layer complex object to be read. If the Layer complex object is the last Layer complex object to be read, the decision in decision block 503 is "YES." If the Layer complex object is not the last Layer complex object to be read, the decision in decision block 503 is "NO." If the decision in decision block 503 is "YES," the method 500 terminates. On the other hand, if the decision in decision block 503 is "NO," in block 504, the reader identifies the next Layer complex object and returns to block 502.

Figure 12:
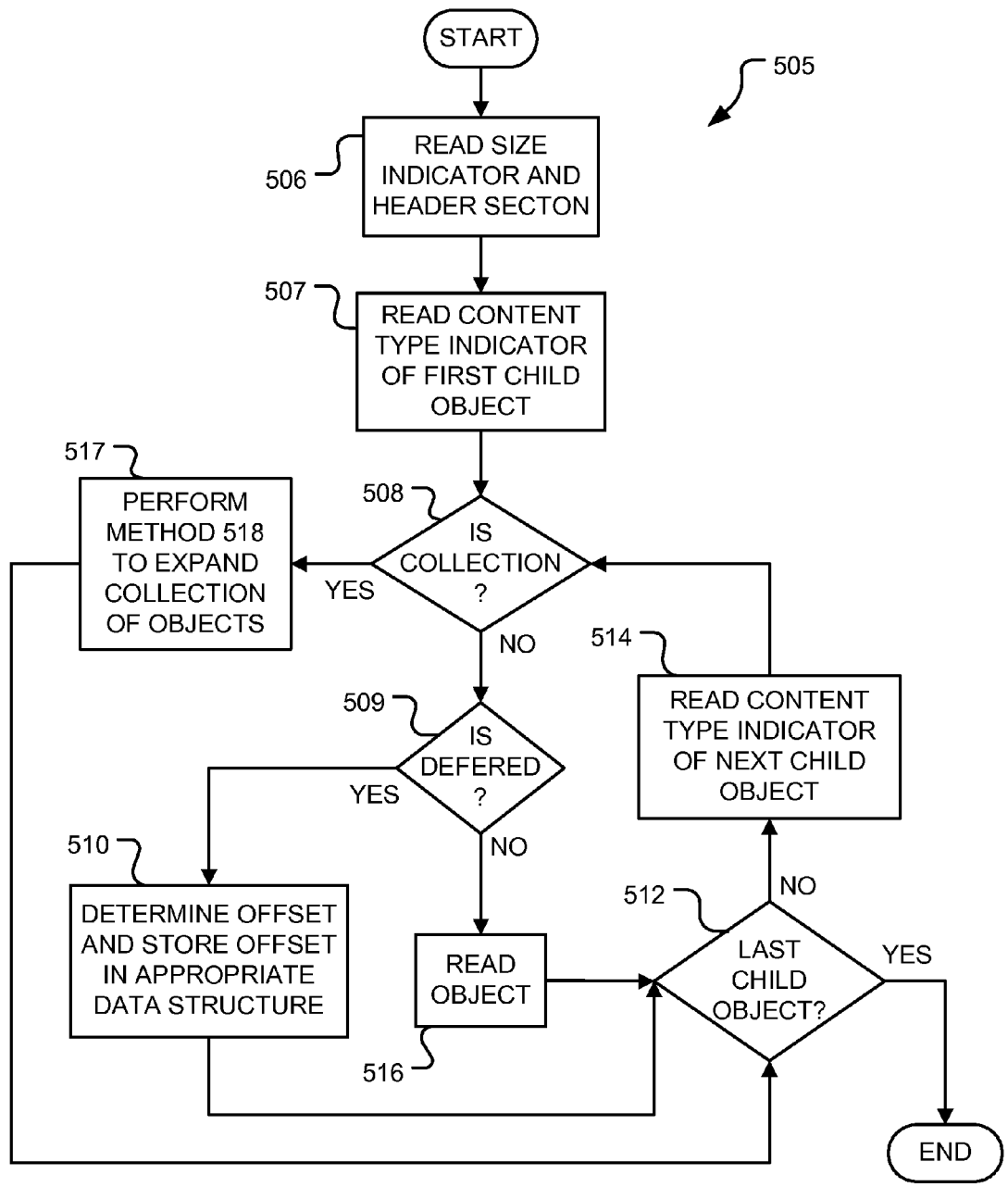
FIG. 12 is a method of deferring reading of a child object of a complex object having the complex format of FIG. 4.

FIG. 12 is a flow diagram of the exemplary method 505 configured to parse complex objects and selectively defer reading of child objects and/or objects within a collection having particular content types. In first block 506, the reader reads the size indicator 323 and the header section 356 of the complex object (e.g., a Layer complex object, a Directory complex object, a RegKey complex object, and the like). In next block 507, the reader reads the content type indicator 342 of the first child object in the body section 358.

In decision block 508, the reader determines whether the first child object is a collection having the collection format 340. If the first child object is a collection, the decision in decision block 508 is "YES." If the first child object is not a collection, the decision in decision block 508 is "NO."

If the decision in decision block 508 is "NO," in decision block 509, the reader determines whether to read the first child object 410 or defer reading the first child object. A function named "IsDeferredType" may be used to determine whether the content type (e.g., "Directory") is to be deferred. If the function determines content of this type is to be deferred, the decision in decision block 509 is "YES." If the function determines content of this type is to be read, the decision in decision block 509 is "NO."

If the decision in decision block 509 is "YES," in block 510, the reader determines the offset value and stores the offset value in an appropriate data structure so that the deferred portion may be expanded at a later time when needed. For example, if the deferred data is a Directory complex object (i.e., the data for configuring a subdirectory in the virtual filesystem 150), the offset value may be stored in a subdirectory used as a placeholder in the virtual filesystem 150. The placeholder subdirectory may be empty except for the offset value and have the name indicated by the Name indicator 424 in the skipped Directory complex object. The offset value indicates where in the virtualized application file 140 or the xlayer file 300 the skipped data may be located when need. By way of another example, if the deferred data is a RegKey complex object (i.e., the data for configuring a sub-key in the virtual registry 152), the offset value may be stored in a sub-key used as a placeholder in the virtual registry 152. The placeholder sub-key may be empty except for the offset value and have the name indicated by the Name indicator 464 in the skipped RegKey complex object. The offset value indicates where in the virtualized application file 140 or the xlayer file 300 the skipped data may be located when need.

In block 510, after storing the offset value, the reader advances in the data stream (e.g., the virtualized application file 140 or the xlayer file 300) by the amount specified in the offset value.

When the virtual application 110 needs to access the data stored in a skipped subdirectory or a skipped sub-key, a method 540 (described below and illustrated in FIG. 14) may be used.

Then, decision block 512 of FIG. 12 determines whether the current child object of the Layer complex object is the last child object. If the current child object is the last child object, the decision in decision block 512 is "YES." If the current child object is not the last child object, the decision in decision block 512 is "NO."

If the decision in decision block 512 is "YES," the method 505 terminates. If the decision in decision block 512 is "NO," in block 514, the reader reads the content type indicator 342 of the next child object of the Layer complex object and returns to decision block 508.

If the decision in decision block 509 is "NO," in block 516, the reader reads the data in the child object and stores it in the appropriate data structure in the virtual runtime environment. For example, if the child object is a LayerCondition simple object (e.g., the first child object 410), the environmental variable values are read from the EnvironmentVariable simple object and used to set the values of corresponding environmental variables in the virtual runtime environment. Then, the reader returns to decision block 512.

If the decision in decision block 508 is "YES," in block 517, the reader performs a method 518 to read a collection of objects. Then, the reader advances to decision block 512.

Figure 13:
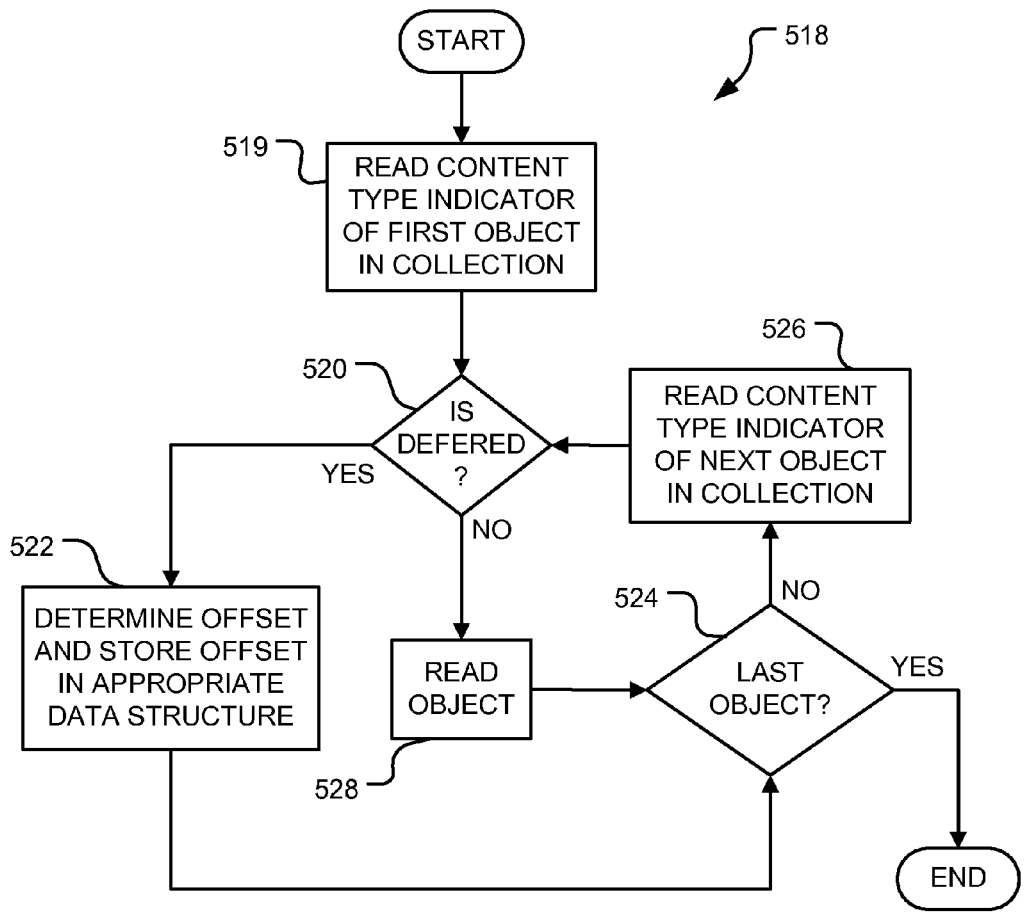
FIG. 13 is a method of deferring reading an object in a collection of simple or complex objects based on a content type indicator of the object.

FIG. 13 is a flow diagram of the exemplary method 518 configured to parse a collection of objects and selectively defer reading of objects within the collection having one or more predetermined content types. In first block 519, the reader reads the content type indicator 342 of the first object of the collection. In decision block 520, the reader determines whether to read the first collection object or defer reading the first collection object. The function named "IsDeferredType" may be used to determine whether the content type (e.g., "Directory") is to be deferred. If the function determines content of this type is to be deferred, the decision in decision block 520 is "YES." If the function determines content of this type is to be read, the decision in decision block 520 is "NO."

If the decision in decision block 520 is "YES," in block 522, the reader determines the offset value and stores the offset in an appropriate data structure so that the deferred portion may be expanded at a later time when needed. For example, if the deferred data is a Directory complex object (i.e., data for configuring a subdirectory in the virtual filesystem 150), the offset value may be stored in a subdirectory used as a placeholder in the virtual filesystem 150. The placeholder subdirectory may be empty except for the offset value and have the name indicated by the Name indicator 424 in the skipped Directory complex object. The offset value indicates where in the virtualized application file 140 or the xlayer file 300 the skipped data may be located when need. By way of another example, if the deferred data is a RegKey complex object (i.e., data for configuring a sub-key in the virtual registry 152), the offset value may be stored in a sub-key used as a placeholder in the virtual registry 152. The placeholder sub-key may be empty except for the offset value and have the name indicated by the Name indicator 464 in the skipped RegKey complex object. The offset value indicates where in the virtualized application file 140 or the xlayer file 300 the skipped data may be located when need.

When the virtual application 110 needs to access the data stored in a skipped subdirectory or a skipped sub-key, the method 540 (described below and illustrated in FIG. 14) may be used.

Then, decision block 524 of FIG. 13 determines whether the current collection object of the collection is the last object in the collection. If the current object is the last object in the collection, the decision in decision block 524 is "YES." If the current object is not the last object in the collection, the decision in decision block 524 is "NO."

If the decision in decision block 524 is "YES," the method 518 terminates. If the decision in decision block 524 is "NO," in block 526, the reader reads the content type indicator 342 of the next object of the collection and returns to decision block 520.

If the decision in decision block 520 is "NO," in block 528, the reader reads the data in the collection object and stores it in the appropriate data structure in the virtual runtime environment. For example, if the collection object is an EnvironmentVariable simple object, the environmental variable values are read from the EnvironmentVariable simple object and used to set the values of corresponding environmental variables in the virtual runtime environment. Then, the reader advances to decision block 524.

An exemplary implementation of the method 518 is provided in the following pseudocode. The pseudocode defines a function named "ExpandDeferredRegion." The "ExpandDeferredRegion" function receives a single parameter, a structure named "SChildDataForLayer" having two members: an "OwningLayer" member and an "Offset" member may be used to store offset placeholders.

```
struct SChildDataForLayer
{
    CComPtrConfigLayer    OwningLayer;
    ULONGLONG             Offset;
};
```

As explained above, virtual applications can be implemented using more than one Layer complex object. The "OwningLayer" member identifies the particular Layer complex object being parsed. The "Offset" member identifies a start location of a collection of objects to be parsed. By way of a non-limiting example, the start location is the beginning of the size indicator 323 of a collection of objects.

In this example, the "ExpandDeferredRegion" function reads binary data from the collection of objects, wherein the size indicator 323 is followed by the count indicator 366. The collection of objects may be the second child object 412 and/or the third child object 450. Further, the collection of objects may be a Directory complex object nested inside the second child object 412 and/or a RegKey complex object nested inside the third child object 450. In the pseudocode below, a BinaryReader class provided by .NET is used. The BinaryReader class provides a plurality of predefined read operations, such "ReadInt32," "ReadString," etc. The "ReadInt32" function reads a four-byte signed integer from the current stream (i.e., the size indicator 323) and advances the current position of the stream by four bytes.

```
ExpandDeferredRegion(SChildDataForLayer data)
    childData.OwningLayer.SetCurrentPosition(data.Offset)
    BinaryReader reader(data.OwningLayer)
    collectionSize = reader.ReadInt32( )
    readEnd = data.Offset + collectionSize
    childCount = reader.ReadInt32( )
    For Each child 0 to childCount – 1
        ReadChildHeaderInformation(reader)
        While reader.Position < readEnd
            type = reader.ReadInt32( )
            if (IsDeferredType(type))
                SChildDataForLayer childData
                currentPosition = reader.GetCurrentPosition( )
                skipSize = reader.ReadInt32( )
                childData.Offset = currentPosition
                childData.OwningLayer = data.OwningLayer
                StoreChildDataForDeferredExpansion(childData)
                reader.SetPosition(currentPosition + skipSize)
            Else
                ReadItemNormally(reader)
            End
        End
    End
```

In the pseudocode above, the reader reads the content type indicator 342 of each object of the collection (blocks 519 and 526). The function named "IsDeferredType" determines whether data in a particular object in the collection is to be deferred based on the content type indicator 342 of the object (block 520). The "IsDeferredType" function returns "TRUE" when data stored in a object is to be skipped (or deferred) and "FALSE" otherwise. If subdirectories and sub-keys are to be skipped, the "IsDeferredType" function returns "TRUE" when the content type indicator 342 of the object is "Directory" or "RegKey." In such an implementation, if the content type indicator 342 of the object is other than "Directory" or "RegKey," the "IsDeferredType" function returns "FALSE."

When the "IsDeferredType" function returns "TRUE," the "ExpandDeferredRegion" function determines the current position of the reader in the object and stores the current position in a variable named "currentPosition." Then, the "ExpandDeferredRegion" function reads the size indicator 323 of the child object and stores it in a variable named "skipSize." The value stored in "currentPosition" is stored in the "Offset" member of an instance of the SChildDataForLayer struct named "childData." A function named StoreChildDataForDeferredExpansion is called to store the value of the variable "currentPosition" (i.e., the value stored in the "Offset" member of the structure named "childData") in the data-structure being populated (e.g., a virtual directory or virtual registry key node) (block 522). Then, the "ExpandDeferredRegion" function sets the reader position to the end of the deferred child object (i.e., the location at a sum of the value of the variable named "currentPosition" and the value of the variable named "skipSize"). Thus, the data-structure being populated has the starting position from which to start reading when the skipped portion needs to be expanded.

When the "IsDeferredType" function returns "FALSE," a function named "ReadItemNormally" reads or expands the child object (block 528).

With this deferred expansion of the data used to configure and populate the virtual filesystem 150 and the virtual registry 152, only those portions of the virtual filesystem and virtual registry actually accessed by the virtual application 110 need to be expanded, which may save a significant amount of time spent parsing the Layer complex object.

Figure 14:
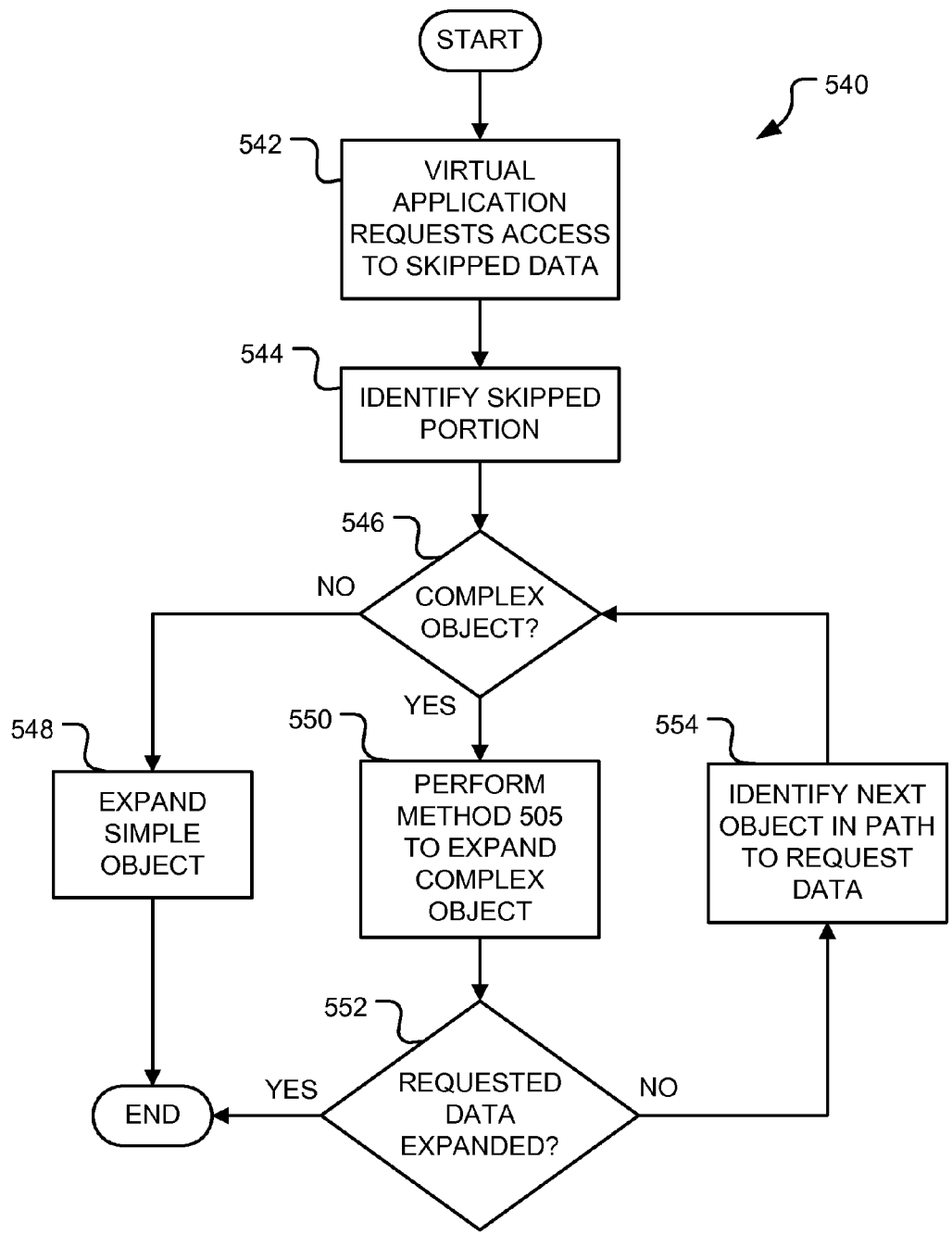
FIG. 14 is a method of reading or expanding an object the reading of which was previously skipped by the method of FIG. 12 and/or the method of FIG. 13.

FIG. 14 is a flow diagram of the method 540 of expanding a previously skipped or deferred portion of the virtualized application file 140 or the xlayer file 300. In first block 542, the virtual application 110 requests access to information stored in a skipped portion of the virtualized application file 140 or the xlayer file 300. For example, the virtual application 110 may request access to a file in the virtual filesystem 150 or a key in the virtual registry 152 that has not been expanded. By way of an illustrative example, the virtual application 110 may be requesting access to a file named "test.txt" stored in the following location ".\program\first\." In this example, the subdirectory named "program" is a subdirectory of the root directory. In the virtual filesystem 150, the subdirectory named "program" was skipped by the reader during startup. The reader stored in its place an empty directory identifying the Layer complex object and the offset value (i.e., start location of the skipped data) whereat the skipped data is stored in the Layer complex object identified.

In next block 544, the skipped portion of the virtualized application file 140 or the xlayer file 300 is identified. The skipped portion is stored within an object having either the simple format 336 (see FIG. 3) or the complex format 338 (see FIG. 4). Therefore, in block 544, the reader identifies a single object having either the simple format 336 or the complex format 338 stored inside a Layer complex object. However, the particular data requested may be stored within one or more objects nested inside the object identified. Therefore, to locate the requested data, the reader may have to parse several layers of nested objects.

When the virtual runtime engine encounters a skipped directory (e.g., the subdirectory named "program"), in block 544, the reader identifies the corresponding object by reading the information identifying the Layer complex object and the offset value stored in the skipped subdirectory in the virtual filesystem 150. The data structure named "SChildDataForLayer" may be used to store the start location of the skipped portion and to identify the Layer complex object in which the skipped portion resides.

Then, in decision block 546, the reader determines whether the skipped object is a complex object. The decision in decision block 546 is "YES" when the skipped object is a complex object. The decision in decision block 546 is "No" when the skipped object is a simple object.

If the decision in decision block 546 is "NO," in block 548, the reader reads the data in the simple object and then the method 540 terminates. On the other hand, if the decision in decision block 546 is "YES," in block 550, the reader performs the method 505 of FIG. 12 to expand the complex object.

In decision block 552, the reader determines whether the requested data has been expanded. For example, at this point, the directory named "program" may have been expanded using the method 505. However, the subdirectories stored in the collection of directories associated with the Directory complex object corresponding to the directory named "program" would have been skipped when the method 518 of FIG. 13 was performed to expand the collection of Directory complex objects. Therefore, at this point, the requested data has not yet been expanded.

The decision in the decision block 552 is "YES" when the requested data has been expanded. On the other hand, the decision block 552 is "NO" when the requested data has not been expanded. If the decision in the decision block 552 is "YES," the method 540 terminates. If the decision in the decision block 552 is "NO," in block 554, the reader identifies a next object in a path to the requested data (e.g., the Directory complex object corresponding to the directory named "first") and returns to the decision block 546.

Forward and Backward Compatibility

Because each object incorporated in the file format 320 (see FIG. 2) indicates its own size (via the size indicators 323) and child objects are self-describing via the content type indicator 342, the code that implements the reader of the virtual runtime engine can be made tolerant of unfamiliar simple and complex object types. This allows older virtual machine runtimes to be made compatible with newer virtualized application files and/or xlayer files, provided their major version identifiers are the same. Likewise, the code implementing the virtual runtime reader can be made tolerant of reading older virtualized application files and/or xlayer files, in which certain simple and complex object types may not be found or in which the format of one or more the simple and/or complex object types has changed.

Forward and backward compatibility may be provided at least in part by a SizeReader class that may used to read data from the Layer complex object. The SizeReader class may be derived from the BinaryReader class provided by the .NET framework offered by Microsoft Corporation. However, the SizeReader class differs from the BinaryReader class in that the SizeReader class knows how much data is stored in the object. If the reader tries to read past the end of the object, a default value is returned. Furthermore, when reading is finished, the underlying stream is taken to the end of the current object, even if all of the data has not yet been read. In other words, the reader jumps to the end of the object being read. If new data items are added after those of previously included in the format, when the reader jumps to the end of the object being read, the reader ignores the new data items with which the reader is unfamiliar.

As a derived class, the SizeReader class supports operations provided by the BinaryReader class such as ReadInt32, ReadString, etc. However, several functions may be modified or overridden. A portion of a basic class specification for the SizeReader class is provided below:

```
internal class SizeReader : BinaryReader
{
    BinaryReader __reader;
    long __lEndPosition;
    long __lInitialPosition;
    /// <summary>
    /// Main constructor
    /// </summary>
    /// <param name="reader"></param>
    /// <param name="fAtSizeValue"></param>
    public SizeReader (BinaryReader reader)
        : base (reader.BaseStream)
    {
        __reader = reader;
        __lEndPosition = long.MaxValue;
        __lInitialPosition = reader.BaseStream.Position;
        OnSizeValue ( );
    }
    /// <summary>
    /// When defering the reading of size value
    /// </summary>
    public void OnSizeValue ( )
    {
        int cbSize = __reader.ReadInt32 ( );
        __lEndPosition = __lInitialPosition + cbSize;
    }
    /// <summary>
    /// Indictes if we've hit the end of the structure
    /// </summary>
    /// <returns></returns>
    public bool CanRead
    {
        get
        {
            return __reader.BaseStream.Position < __lEndPosition;
        }
    }
    /// <summary>
    /// Called when done reading data
    /// </summary>
    public void DoneReading ( )
    {
        if (__lEndPosition != long.MaxValue)
        {
            __reader.BaseStream.Position = __lEndPosition;
            __lEndPosition = long.MaxValue;
        }
    }
    //
    // Binary Reader overrides
    //
    protected override void Dispose (bool disposing)
    {
        if (disposing)
        {
            DoneReading ( );
        }
    }
    public override byte[ ] ReadBytes (int count)
    {
        if (CanRead)
        {
            return __reader.ReadBytes (count);
        }
        else
        {
```

-continued

```
        return new byte[0];
    }
}
public override int ReadInt32 ( )
{
    if (CanRead)
    {
        return __reader.ReadInt32 ( );
    }
    else
    {
        return 0;
    }
}
public override string ReadString ( )
{
    if (CanRead)
    {
        return __reader.ReadString ( );
    }
    else
    {
        return string.Empty;
    }
}
}
```

For the sake of brevity, most of the BinaryReader methods have been omitted from the basic class specification provided above. However, three of the overridden functions, "Read-Bytes," "ReadInt32," and "ReadString," have been provided as examples. As mentioned above, each of these functions has been modified to return a default value. The constructor to this class uses a function named "OnSizeValue" to determine an amount of data stored in an object. The amount of data stored in an object informs the reader as to how much data there is to be read in the child objects. A function named "Dispose" is called when reading with respect to a particular object is finished. If the Boolean type variable named "disposing" is "TRUE," the "Dispose" function calls a function named "DoneReading," which sets the underlying stream to the end of the object.

Figure 15:
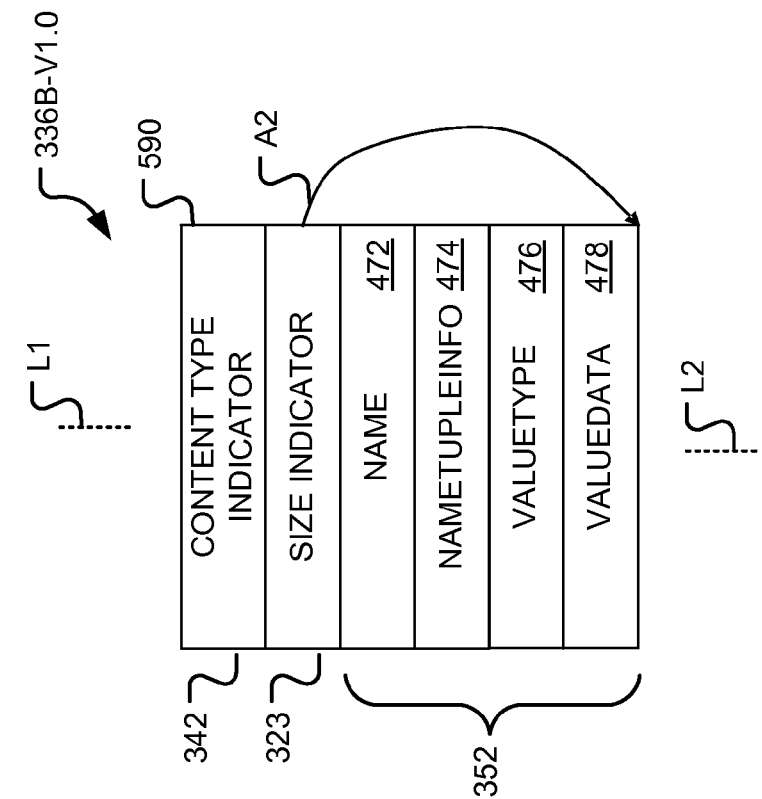
FIG. 15 is a format for use by a RegValue simple object configured to be read by a reader of a virtual runtime engine having a version 1.0.

An example of how the simple and complex formats 336 and 338 provide forward and backward compatibility will now be described. FIG. 15 illustrates a simple object 590 configured for a version "1.0" of the virtual runtime engine. Thus, the xlayer file 300 or the virtualized application file 140 in which the simple object 590 is stored has a format version "1.0" (i.e., the major version identifier 326 has a value of "1" and the minor version identifier 327 has a value of "0"). The content type indicator 342 identifies the simple object 590 as having type "RegValue." As explained above, a RegValue simple object may be used to store a register key value. The simple object 590 has a format 336B-V1.0, which is identical to format 336B illustrated in FIG. 10. Thus, the simple object 590 includes the content type indicator 342, the size indicator 323, and four simple data items: the Name indicator 472 (e.g., a string), the NameTupleInfo indicator 474 (e.g., a 32-bit integer), the ValueType indicator 476 (e.g., a number of bytes or block of binary data), and the ValueData field 478.

Figure 16:
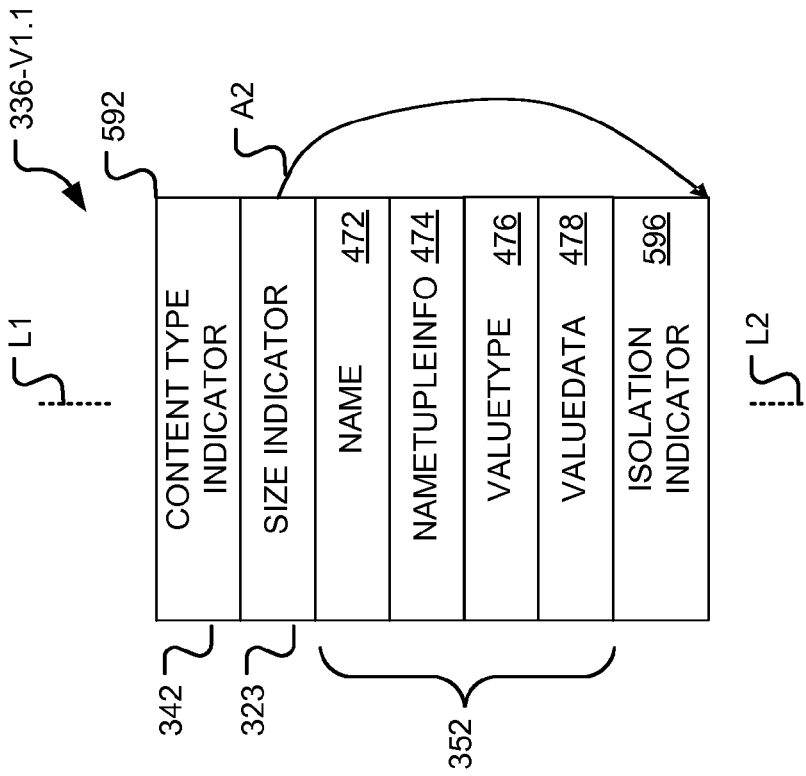
FIG. 16 is a format for use by a RegValue simple object configured to be read by a reader of a virtual runtime engine having a version 1.1.

FIG. 16 illustrates a simple object 592 configured for a version "1.1" of the virtual runtime engine. Therefore, the simple object 590 and the simple object 592 have the same major version identifier 326 but different minor version identifiers 327. Because the simple object 590 and the simple object 592 have the same major version identifier 326 they may be read by the same virtual runtime reader. The content type indicator 342 identifies the simple object 592 as having type "RegValue." However, instead of having the same format 336B-V1.0 as the simple object 590, the simple object 592 has a format 336B-V1.1, which includes one more data item than the format 336B-V1.0 illustrated in FIG. 15. Specifically in addition to the content type indicator 342, the size indicator 323, the Name indicator 472, the NameTupleInfo indicator 474, the ValueType indicator 476, and the ValueData field 478, the format 336B-V1.1 also include an isolation indicator 596 (e.g., a 32-bit integer).

The dashed lines "L1" and "L2" above and below the RegValue simple objects 590 and 592 depicted in FIGS. 15 and 16, respectively, indicate that the simple objects 590 and 592 may be located within the binary data of the Layer complex object (i.e., within the data stream read from the Layer complex object).

The following pseudocode demonstrates how the reader of the virtual runtime engine version 1.0 might read the simple object 592 illustrated in FIG. 16 configured for a version 1.1 of the virtual runtime engine.

```
ReadRegValueV10(BinaryReader reader)
SizeReader sizeReader(reader)
name = sizeReader.ReadString( )
regType = sizeReader.ReadInt32( )
regData = sizeReader.ReadBytes( )
sizeReader.Dispose( )
```

The last line in the pseudocode above jumps to the end of simple object 592 without having had read all of the simple data items. In other words, the "Dispose" function skips the isolation indicator 596, with which the reader of the virtual runtime engine version 1.0 is unfamiliar.

The following pseudocode demonstrates how the virtual runtime engine version 1.1 might read the simple object 590 illustrated in FIG. 15 configured for a version 1.0 of the virtual runtime engine.

```
ReadRegValueV11(BinaryReader reader)
SizeReader sizeReader(reader)
name = sizeReader.ReadString( )
regType = sizeReader.ReadInt32( )
regData = sizeReader.ReadBytes( )
isolation = sizeReader.ReadInt32( )
sizeReader.Dispose( )
```

In the pseudocode above, the reader attempts to read the isolation indicator 596 that is not in 1.0 version of the RegValue simple object (i.e., simple object 590). Thus, the reader may be described as having read past the end of the simple object 590. As discussed above, the reader knows the size of the simple object 590 and can determine the reader has read past the end of the simple object 590. When this occurs, a default value (e.g., a 32-bit integer value of zero) may be returned. Again, in the last line of the pseudocode above, the "Dispose" function is called after all known data items have been read.

In both cases, the reading of the RegValue simple objects 590 and 592 proceeds without a problem. When a new data member is added to the simple or complex format for a particular content type, it is desirable to ensure that the SizeReader class is configured to provide a default value for the new data member that has the correct semantics for older versions of the object format. For example, when the reader for the virtual runtime engine version 1.1 reads the simple object 590 and obtains the default value (e.g., 32-bit integer value of zero) provided for the isolation indicator 596, the virtual runtime engine version 1.1 should respond in a manner substantially similar to the manner in which the reader for the virtual runtime engine version 1.0 reads would respond when reading the simple object 590.

Figure 17:
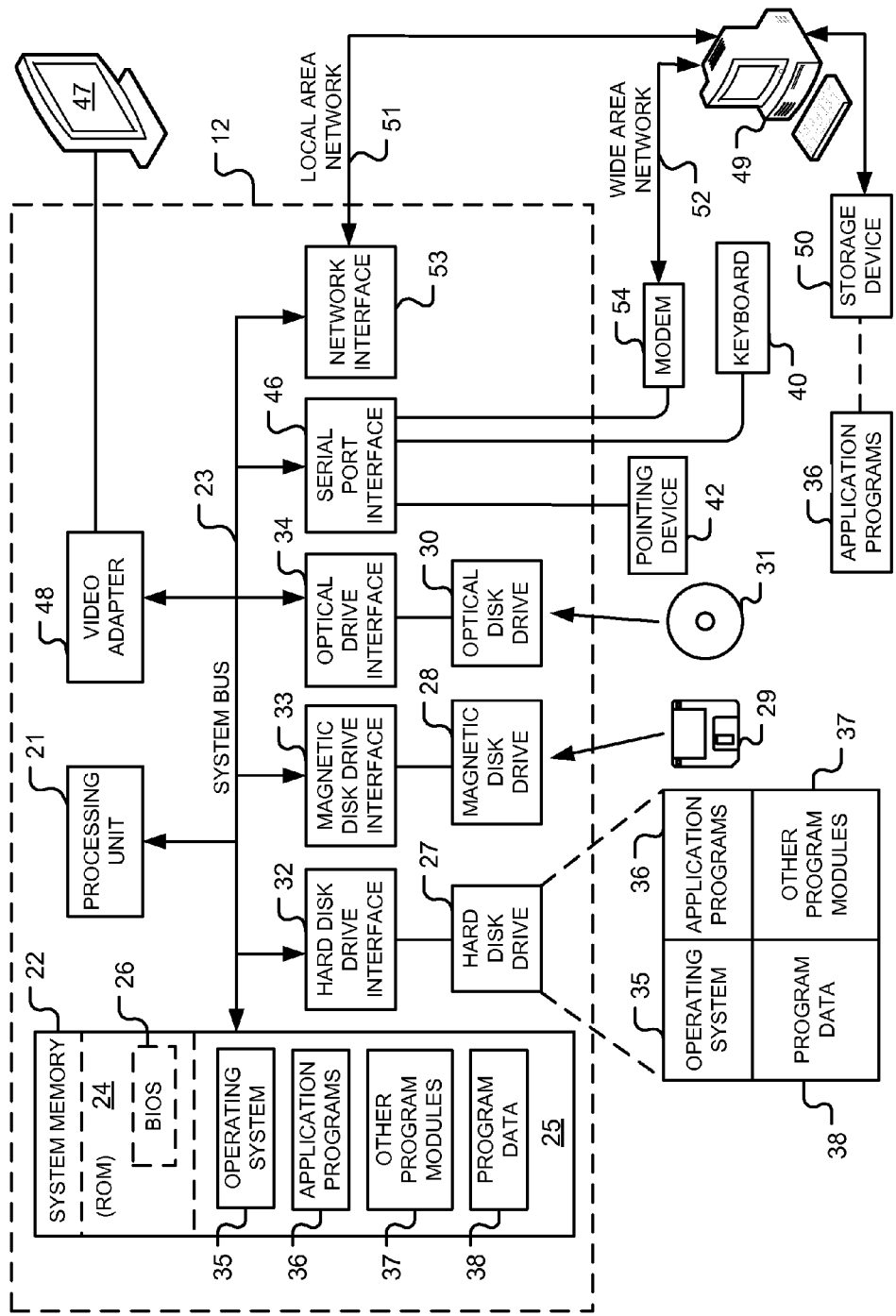
FIG. 17 is a diagram of a hardware environment and an operating environment in which the computing device of the system of FIG. 1 may be implemented.

FIG. 17 is a diagram of hardware and an operating environment in conjunction with which implementations of the virtual application file 140, the xlayer file 300, the authoring tool 170, and/or virtual runtime engine may be practiced. The description of FIG. 17 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 17 includes a general-purpose computing device in the form of a computing device 12. Each of the virtual application file 140, the xlayer file 300, the authoring tool 170, and/or virtual runtime engine may be implemented using one or more computing devices like the computing device 12. By way of non-limiting example, the virtual application file 140, the xlayer file 300, the authoring tool 170, and/or virtual runtime engine may be implemented on the computing device 12.

The computing device 12 includes the system memory 22, a processing unit 21, and a system bus 23 that operatively couples various system components, including the system memory 22, to the processing unit 21. There may be only one or there may be more than one processing unit 21, such that the processor of computing device 12 comprises a single central-processing unit (CPU), or a plurality of processing units, commonly referred to as a parallel processing environment. The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computing device 12. It should be appreciated by those skilled in the art that any type of computer-readable media which can store data that is accessible by a computer, such as magnetic cassettes, flash memory cards, USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 17 include a local-area network (LAN) 51 and a wide-area network (WAN) 52. Such networking environments are commonplace in offices, enterprise-wide computer networks, intranets and the Internet.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

Returning to FIG. 1, the host operating system 35, the virtual application file 140, the xlayer file 300, the authoring tool 170, and/or virtual runtime engine may be stored as computer executable components on the system memory 22. Each of the host operating system 35, the virtual application file 140, the xlayer file 300, the authoring tool 170, and/or virtual runtime engine may be implemented using software components that are executable by the processing unit 21 and when executed perform the functions described above.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A computer-readable medium comprising instructions that when executed by a processor implement a reader configured to read a binary file storing a plurality of nested objects, each of the nested objects storing a content type indicator, a size indicator, and information for configuring a virtual application during an initialization process, the reader being configured to:
   decide whether to read a particular object of the plurality of nested objects based on the content type indicator of the particular object;
   if the reader decides not to read the particular object, store a location of the particular object in a data structure of the virtual application for subsequent reading by the reader, wherein the location of the particular object stored in the data structure of the virtual application is a location of the size indicator;
   receive a request to read the particular object after the reader has stored the location of the size indicator of the particular object in the data structure of the virtual application;
   in response to the request, obtain the location of the size indicator from the data structure of the virtual application and read the size indicator stored at the location;
   identify an end location of the particular object as a function of the location and the size indicator read from the location;
   identify a format associated with the particular object, the format comprising a plurality of data items arranged in a predetermined order;
   if the particular object includes the plurality of data items arranged in the predetermined order, read the plurality of data items in the predetermined order from the particular object;
   if the particular object includes fewer than all of the plurality of data items, read the data items included in the particular object, and assign default values to data items not read from the particular object; and
   if the particular object includes one or more additional data items positioned after the plurality of data items, after reading the plurality of data items in the predetermined order from the particular object, advance to the end location of the particular object thereby skipping the one or more additional data items positioned after the plurality of data items.

2. The computer-readable medium of claim 1, wherein the request to read the particular object comprises a request to read a selected object nested inside the particular object, and the reader is further configured to:
   in response to the request, obtain the location of the particular object from the data structure,
   until the selected nested object is read until the selected nested object is read, identify a next object nested inside the particular object and read the next object.

3. A method performed by a computing device, the method comprising:
   identifying a file storing a plurality of objects each storing a content type indicator, a size indicator, and information for configuring a virtual application during an initialization process;

for each of the plurality of objects, during the initialization process, determining whether to defer reading the object based on the content type indicator of the object;

for each deferred object, storing an offset value in a placeholder portion of the virtual application, the offset value indicating a location at which the size indicator of the deferred object is stored in the file, the placeholder portion of the virtual application being configured to store content of the type indicted by the content type indicator of the deferred object; and for each non-deferred object, reading the information stored in the non-deferred object and configuring the virtual application with the information read, wherein for each non-deferred object, reading the information stored in the non-deferred object comprises:

reading the size indicator of the non-deferred object;

identifying an end location of the non-deferred object based on the size indicator;

identifying a format associated with the non-deferred object, the format comprising a plurality of data items arranged in a predetermined order;

if the non-deferred object includes the plurality of data items arranged in the predetermined order, reading the plurality of data items in the predetermined order from the non-deferred object;

if the non-deferred object includes fewer than all of the plurality of data items, reading the data items included in the non-deferred object, and assigning default values to data items not read from the non-deferred object; and if the non-deferred object includes one or more additional data items positioned after the plurality of data items, after reading the plurality of data items in the predetermined order from the non-deferred object, advancing to the end location of the non-deferred object thereby skipping the one or more additional data items positioned after the plurality of data items.

4. The method of claim 3, further comprising:
initiating the initialization process of the virtual application by executing the file.

5. The method of claim 3, further comprising:
after completion of the initialization process, receiving a request for information referencing a selected placeholder portion of the virtual application;
reading the offset value from the selected placeholder portion;
identifying a location in the file corresponding to the offset value read from the selected placeholder portion; and
reading the information requested from the file starting from the identified location in the file.

6. The method of claim 3, wherein for each of the plurality of objects, during the initialization process, determining whether to defer reading the object based on the content type indicator of the object comprises:
deferring reading of the object if the content type indicator of the object indicates the object is storing information for configuring a directory or a registry key.

7. The method of claim 6, wherein for each deferred object:
if the content type indicator of the deferred object indicates the object is storing information for configuring a directory, the placeholder portion of the virtual application in which the offset value is stored comprises a directory of a virtual filesystem of the virtual application, and
if the content type indicator of the deferred object indicates the object is storing information for configuring a registry key, the placeholder portion of the virtual application in which the offset value is stored comprises a key of a virtual registry of the virtual application.

8. The method of claim 3, wherein the plurality of data items comprise a plurality of simple data items.

9. A computer-readable medium comprising:
a file storing a plurality of objects each storing a content type indicator, a size indicator, and information for configuring a virtual application during an initialization process; and
instructions that when executed by a processor perform a method comprising:
for each of the plurality of objects, during the initialization process, determining whether to defer reading the object based on a type of content indicated by the content type indicator of the object;
for each deferred object, storing an offset value in a placeholder portion of the virtual application, the offset value indicating a location at which the size indicator of the deferred object is stored in the file, the portion of the virtual application being configured to store content of the type indicted by the content type indicator of the deferred object; and
for each non-deferred object, reading the information stored in the non-deferred object, and configuring the virtual application with the information read, wherein for each non-deferred object, reading the information stored in the non-deferred object comprises:
reading the size indicator of the non-deferred object;
identifying an end location of the non-deferred object based on the size indicator;
identifying a format associated with the non-deferred object, the format comprising a plurality of data items arranged in a predetermined order;
if the non-deferred object includes the plurality of data items arranged in the predetermined order, reading the plurality of data items in the predetermined order from the non-deferred object;
if the non-deferred object includes fewer than all of the plurality of data items, reading the data items included in the non-deferred object, and assigning default values to data items not read from the non-deferred object; and
if the non-deferred object includes one or more additional data items positioned after the plurality of data items, after reading the plurality of data items in the predetermined order from the non-deferred object, advancing to the end location of the non-deferred object thereby skipping the one or more additional data items positioned after the plurality of data items.

10. The computer-readable medium of claim of claim 9, wherein the method further comprises:
initiating the initialization process of the virtual application by executing the file.

11. The computer-readable medium of claim of claim 9, wherein the method further comprises:
after completion of the initialization process, receiving a request for information referencing a selected placeholder portion of the virtual application;
reading the offset value from the selected placeholder portion;
identifying a location in the file corresponding to the offset value read from the selected placeholder portion; and
reading the information requested from the file starting from the identified location in the file.

12. The computer-readable medium of claim of claim 9, wherein for each of the plurality of objects, during the initialization process, determining whether to defer reading the object based on the content type indicator of the object comprises:

deferring reading of the object if the content type indicator of the object indicates the object is storing information for configuring a directory or a registry key.

13. The computer-readable medium of claim of claim 12, wherein for each deferred object:
if the content type indicator of the deferred object indicates the object is storing information for configuring a directory, the placeholder portion of the virtual application in which the offset value is stored comprises a directory of a virtual filesystem of the virtual application, and
if the content type indicator of the deferred object indicates the object is storing information for configuring a registry key, the placeholder portion of the virtual application in which the offset value is stored comprises a key of a virtual registry of the virtual application.

14. The computer-readable medium of claim of claim 9, wherein the plurality of data items comprise a plurality of simple data items.

* * * * *